(12) United States Patent
Kawasaki

(10) Patent No.: US 9,256,267 B2
(45) Date of Patent: Feb. 9, 2016

(54) SEMICONDUCTOR DEVICE

(71) Applicant: FUJITSU LIMITED, Kawasaki-shi, Kanagawa (JP)

(72) Inventor: Kenichi Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 408 days.

(21) Appl. No.: 13/926,604

(22) Filed: Jun. 25, 2013

(65) Prior Publication Data
US 2014/0070878 A1 Mar. 13, 2014

(30) Foreign Application Priority Data
Sep. 12, 2012 (JP) ................. 2012-200877

(51) Int. Cl.
*G06F 1/32* (2006.01)
*G06F 1/26* (2006.01)
(52) U.S. Cl.
CPC .............. *G06F 1/3203* (2013.01); *G06F 1/263* (2013.01); *G06F 1/324* (2013.01); *G06F 1/3296* (2013.01); *Y02B 60/1217* (2013.01); *Y02B 60/1285* (2013.01)
(58) Field of Classification Search
None
See application file for complete search history.

(56) References Cited

U.S. PATENT DOCUMENTS

2002/0190283 A1* 12/2002 Seno .................. G06F 1/10
257/275
2011/0068855 A1 3/2011 Ikenaga

FOREIGN PATENT DOCUMENTS

| JP | 11-202958 | 7/1999 |
|---|---|---|
| JP | 2010-256026 | 11/2010 |
| JP | 2011-066791 | 3/2011 |

OTHER PUBLICATIONS

Yasuyuki Okuma, et al., "0.5-V Input Digital LDO with 98.7% Current Efficiency and 2.7-μA Quiescent Current in 65nm CMOS", IEEE, Sep. 19-22, 2010.
Koji Hirairi, et al., "13% Power Reduction in 16b integer Unit in 40nm CMOS by Adaptive Power Supply Voltage Control with Parity-Based Error Prediction and Detection (PEPD) and Fully Integrated Digital LDO", ISSCC 2012, Feb. 19-23, 2012.

* cited by examiner

*Primary Examiner* — Jared Fureman
*Assistant Examiner* — Aqeel Bukhari
(74) *Attorney, Agent, or Firm* — Fujitsu Patent Center

(57) ABSTRACT

A semiconductor device includes: a plurality of circuit parts; a global power source; a plurality of power source supply circuits; and a plurality of local power source control circuits provided in correspondence to the plurality of circuit parts, wherein each of the plurality of power source supply circuits includes a plurality of discrete supply switches, each of the plurality of local power source control circuits includes: a voltage monitor circuit; a storage circuit storing an output target characteristic value of the voltage monitor circuit; a comparator configured to compare the output characteristic value of the voltage monitor circuit and the target characteristic value; and a switch control circuit configured to control the number of the plurality of turned-on discrete supply switches based on the comparison result of the comparator.

14 Claims, 20 Drawing Sheets

| LOAD | CLOCK FREQUENCY | SUPPLY VOLTAGE |
|---|---|---|
| HIGH LOAD | 400MHz | 1.2V |
| MEDIUM LOAD | 200MHz | |
| LOW LOAD | 100MHz | |
| NO LOAD | 0MHz | |

| LOAD | CLOCK FREQUENCY | SUPPLY VOLTAGE |
|---|---|---|
| HIGH LOAD | 400MHz | 1.2V |
| MEDIUM LOAD | 200MHz | 1.0V |
| LOW LOAD | 100MHz | 0.8V |
| NO LOAD | 0MHz | ~0V |

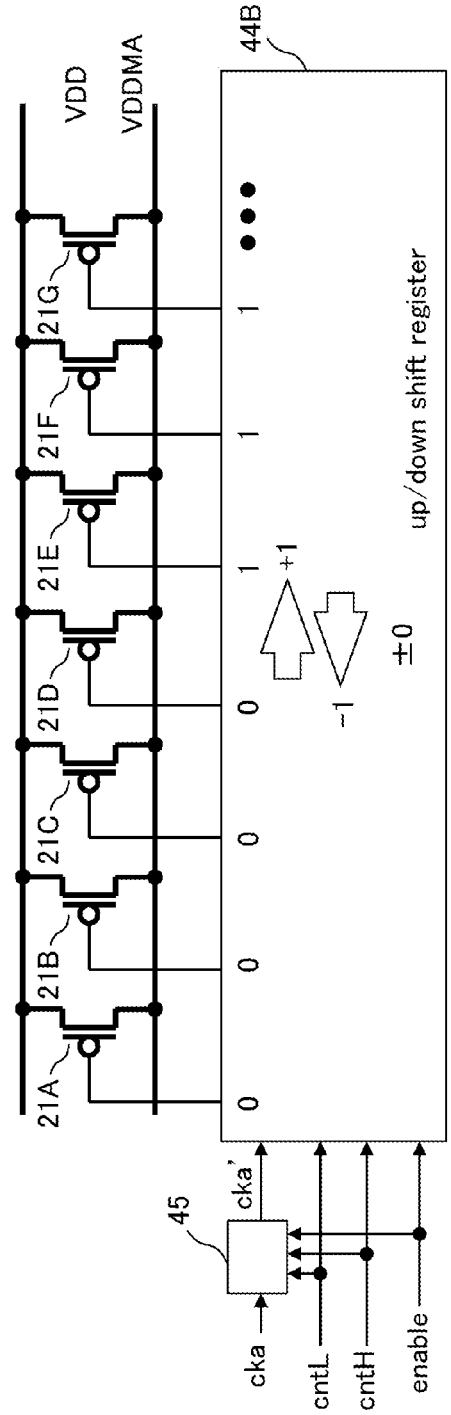

| enable | cntL | cntH | OPERATION |
|---|---|---|---|
| 1 | 0 | 0 | +1 EACH TIME OF INPUT OF cka "H" (NUMBER OF SUPPLY TRANSISTORS TO BE TURNED ON IS INCREASED BY ONE) |
| 1 | 1 | 0 | PERFORM CLOCK GATING AND KEEP STATE OF SHIFT REGISTER (NUMBER OF TURNED-ON SUPPLY TRANSISTORS IS KEPT) |
| 1 | 1 | 1 | −1 EACH TIME OF INPUT OF cka "H" (NUMBER OF SUPPLY TRANSISTORS TO BE TURNED ON IS DECREASED BY ONE) |
| 0 | × | × | ALL RESET TO "1" (POWER GATING: ALL SUPPLY TRANSISTORS ARE TURNED OFF) |

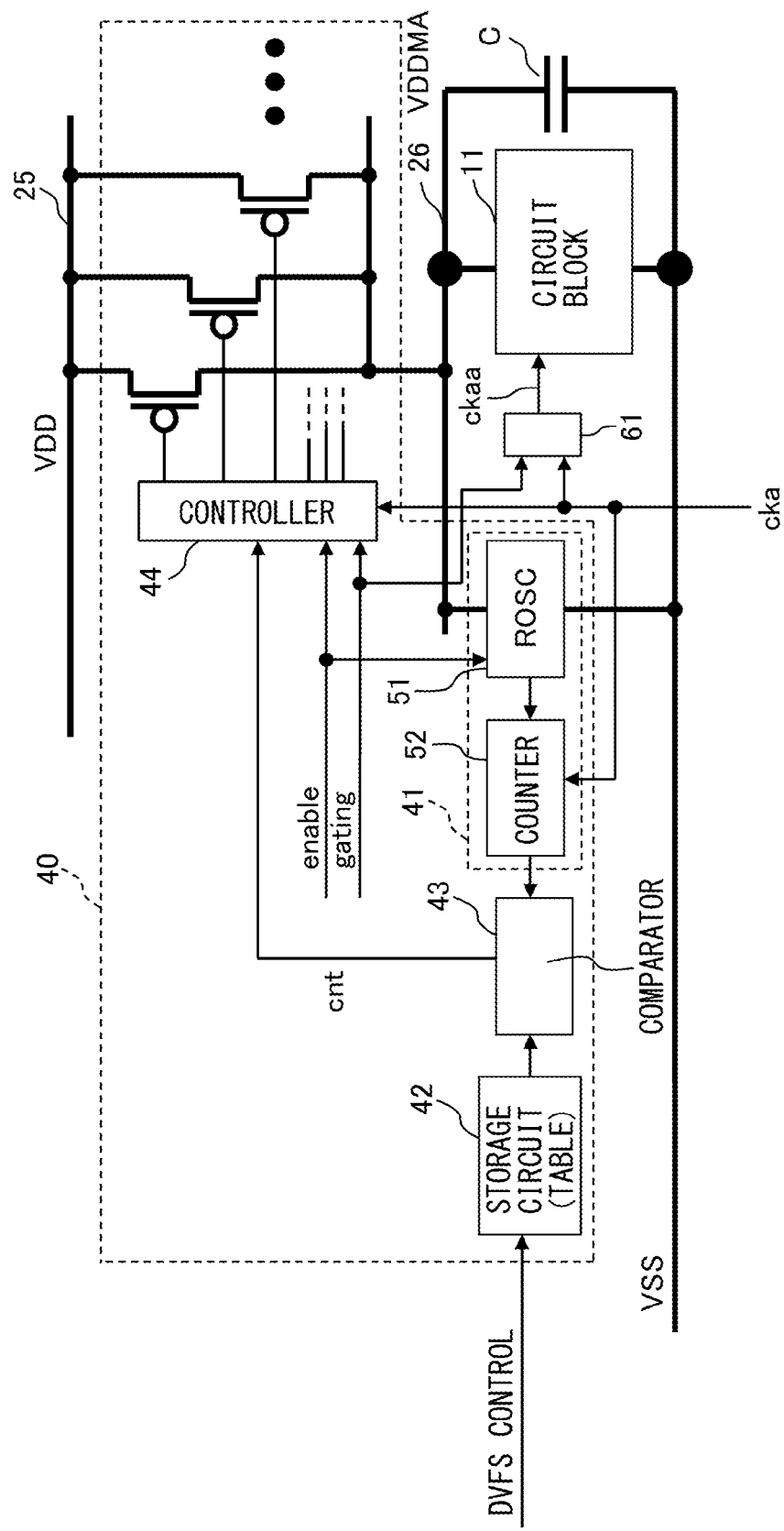

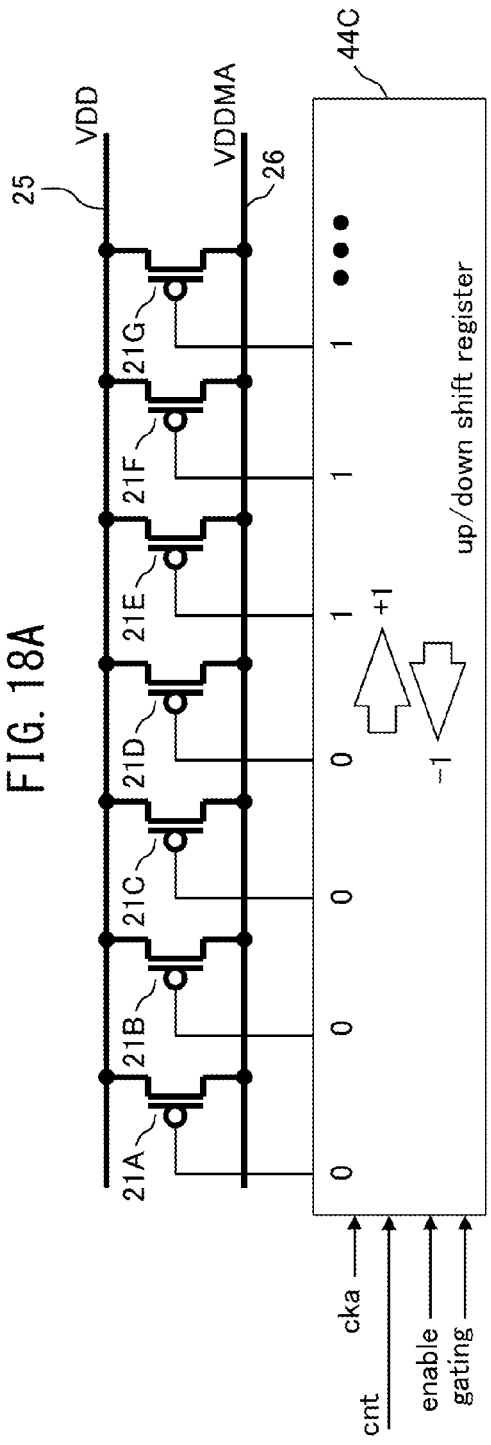

| enable | cnt | gating | OPERATION |
|---|---|---|---|
| 1 | 0 | OTHER THAN TRANSITION FROM 0 TO 1 | +1 EACH TIME OF INPUT OF cka "H" (NUMBER OF SUPPLY TRANSISTORS TO BE TURNED ON IS INCREASED BY ONE) |
| 1 | 1 | OTHER THAN TRANSITION FROM 0 TO 1 | −1 EACH TIME OF INPUT OF cka "H" (NUMBER OF SUPPLY TRANSISTORS TO BE TURNED ON IS DECREASED BY ONE) |
| 0 | × | × | ALL RESET TO "1"(POWER GATING:ALL SUPPLY TRANSISTORS ARE TURNED OFF) |
| 1 | × | TRANSITION FROM 0 TO 1 | AT THE TIME OF TRANSITION FROM 0 TO 1 OF GATING, ALL RESET TO "0" |

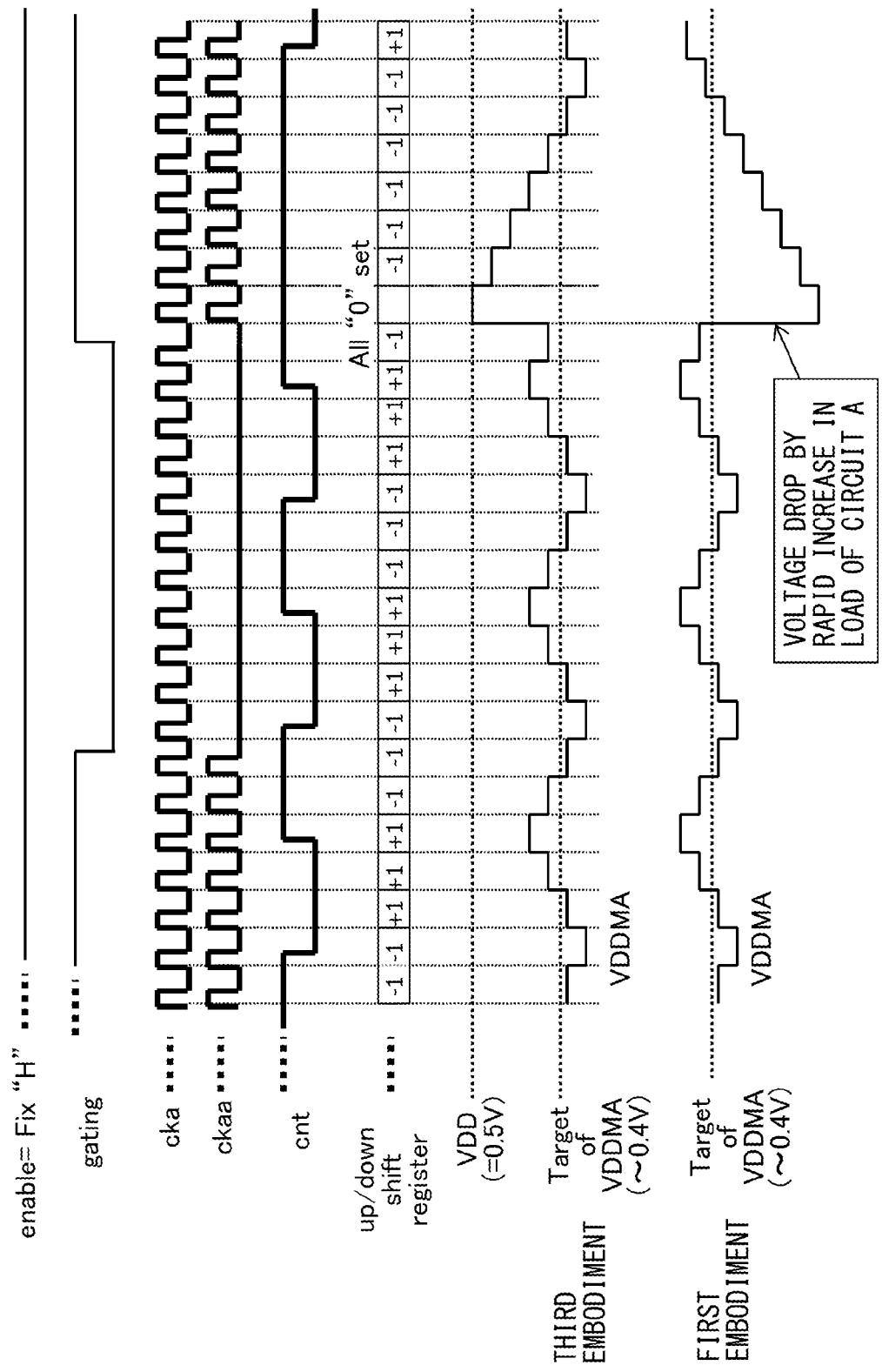

SEMICONDUCTOR DEVICE

CROSS-REFERENCE TO RELATED APPLICATION

This application is based upon and claims the benefit of priority of the prior Japanese Patent Application No. 2012-200877, filed on Sep. 12, 2012, the entire contents of which are incorporated herein by reference.

FIELD

The disclosed techniques relate to a semiconductor device.

BACKGROUND

In recent years, the demand for a reduction in power consumption in a semiconductor device (LSI) is increasing more and more. The interior of an LSI is divided into a plurality of circuit parts (circuit blocks), and power consumption of a circuit whose load is lightened is reduced by reducing the operation frequency.

FIG. 1A is a diagram illustrating a schematic configuration of an LSI in which an operation frequency for each circuit part is changed, and FIG. 1B is a diagram illustrating a time chart indicating the operation of the LSI illustrated in FIG. 1A.

As illustrated in FIG. 1A, an LSI 10 has a plurality of circuit blocks including a first circuit block 11A and a second circuit block 11B, and a power management unit (PMU) 12. The PMU 12 supplies a clock "cka" to the first circuit block 11A and a clock "ckb" to the second circuit block 11B. The PMU 12 divides a system clock "clk" to generate an operation clock and changes the clocks "cka" and "ckb" to be supplied to each circuit block in accordance with a clock mode specified in correspondence to the load state of each circuit block. In this manner, the PMU 12 controls each circuit so as to reduce power consumption while maintaining a desired processing speed.

FIG. 1B illustrates an example of the change in the operation state of the first circuit block 11A. For example, the first circuit block 11A operates at an operation frequency of 100 to 400 MHz, and operates at an operation frequency of 400 MHz in the high-load state where a large amount of data is processed within a brief time and operates at an operation frequency of 100 MHz in the low-load state where a small amount of data is processed within a comparatively long time. In other words, the frequency of the clock "cka" to be supplied to the first circuit block 11A is high when the load is high, and low when the load is low. The power consumption of the first circuit block 11A is larger at the time of operation at 400 MHz than that at the time of operation at 100 MHz.

Similarly, the second circuit block 11B operates at an operation frequency of 50 to 200 MHz in accordance with its load.

The LSI illustrated in FIG. 1A and FIG. 1B changes the frequency of the clock to be supplied to each circuit block, however, the power source voltage supplied to each circuit block is fixed (1.2 V in FIG. 1B).

The power consumption of the circuit block changes in accordance with the operation frequency, however, also changes in accordance with the supplied power source voltage. Therefore, a technique in which power is reduced by reducing not only the operation frequency but also the supply voltage positively in accordance with the load state of the circuit block has been adopted in many cases. Such a technique is referred to as the DVFS (Dynamic Voltage and Frequency Scaling) technique.

FIG. 2A is a diagram illustrating a schematic configuration of the LSI to which the DVFS technique is applied. FIG. 2B is a diagram illustrating a time chart indicating an operation of the LSI illustrated in FIG. 2A.

As illustrated in FIG. 2A, the LSI 10 has a plurality of circuit blocks including the first circuit block 11A and the second circuit block 11B, the PMU 12, and a VREF generation circuit 16.

The first circuit block 11A has an LDO (Low Drop Out) regulator 15A. The second circuit block 11B has an LDO regulator 15B. The VREF generation circuit 16 generates a reference potential VREF to be supplied to the LDO regulators 15A and 15B. The PMU 12 supplies the clock "cka" to the first circuit block 11A and also supplies a control signal "ca" of the supply voltage to the LDO regulator 15A. Further, the PMU 12 supplies the clock "ckb" to the second circuit block 11B and also supplies a control signal "cb" of the supply voltage to the LDO regulator 15B. The PMU 12 changes the frequency of the clock to be supplied and the voltage to be supplied in accordance with the load state of each circuit block specified by the DVFS mode from outside and controls each circuit block so as to reduce power consumption while maintaining the desired processing speed.

When the DVFS technique is applied, if the power source voltage is applied to each circuit block from the outside of the LSI, the number of parts other than the LSI increases, resulting in an increase in the cost. Therefore, a mechanism as illustrated in FIG. 2A is generally adopted, in which the LDO regulator is mounted in correspondence to the circuit block inside the LSI 10, and a single external power source is used, and various voltages are generated inside the LSI to supply a desired voltage to each circuit.

FIG. 2B illustrates an example of the change in the operation state of the first circuit block 11A. For example, the first circuit block 11A operates at an operation frequency of 100 to 400 MHz and on a supply voltage of 0.8 V to 1.2 V. The first circuit block 11A operates on a supply voltage of 1.2 V and at an operation frequency of 400 MHz in the high-load state, and operates on a supply voltage of 0.8 V and at an operation frequency of 100 MHz in the low-load state.

Similarly, the second circuit block 11B operates at an operation frequency of 50 to 200 MHz and on a supply voltage of 0.8 V to 1.2 V in accordance with its load.

Consequently, the PMU 12 outputs a control signal of the frequency of the clock to be supplied to each circuit block and the supply voltage in accordance with the DVFS mode indicating the load state of each circuit block specified from outside. Specifically, the PMU 12 supplies the "cka" of 400 MHz when the first circuit block 11A is in the high-load state and also supplies the "ca" to control the LDO regulator 15A so as to set the supply voltage to 1.2 V. Further, the PMU 12 supplies the "cka" of 100 MHz when the first circuit block 11A is in the low-load state and also supplies the "ca" to control the LDO regulator 15A so as to set the supply voltage to 0.8 V. This also applies to the second circuit block 11B.

In FIG. 2B, the broken line indicates a case where the supply voltage is kept at 1.2 V in the low-load state and by changing the supply voltage from 1.2 V to 0.8 V at the time of the low-load state, the power consumption is reduced by 33% compared to the case of 1.2 V.

FIG. 3A to FIG. 3C are diagrams illustrating the changes in the clock frequency and in the supply voltage in accordance with the load of the first circuit block 11A of the LSI, in which only the clock frequency is changed as illustrated in FIG. 1A and FIG. 1B and the DVFS technique is applied.

As illustrated in FIG. 3A, when only the clock frequency is changed as in FIG. 1A and FIG. 1B, the supply voltage is fixed at 1.2 V and the desired minimum clock frequency by which the first circuit block 11A can process its load is allocated for each clock mode as in FIG. 3A. Then, the PMU 12 changes the frequency of the clock to be supplied to the first circuit block 11A in accordance with the clock mode corresponding to the load. Specifically, the PMU 12 changes the clock frequency to 400 MHz when the load is high, to 200 MHz when the load is medium, to 100 MHz when the load is low, and to 0 MHz when there is no load (i.e., the clock is not supplied).

When the DVFS technique is applied, the frequency of the clock to be supplied to the first circuit block 11A is changed in accordance with the DVFS mode corresponding to the load, and also the LDO regulator 15A is controlled to change the supply voltage. Therefore, as illustrated in FIG. 3B, the desired minimum supply voltage value by which the first circuit block 11A can operate at each clock frequency is allocated for each DVFS mode. That is, a combination of the clock frequency and the supply voltage is set for each DVFS mode so that the power can be reduced in total in accordance with the change in the load state of the first circuit block 11A. Specifically, the clock frequency is changed to 400 MHz when the load is high, to 200 MHz when the load is medium, to 100 MHz when the load is low, and to 0 MHz when there is no load (i.e., the clock is not supplied). Then, the supply voltage is changed to 1.2 V when the load is high, to 1.0 V when the load is medium, to 0.8 V when the load is low, and to 0.8 V or less when there is no load.

FIG. 3C is a diagram illustrating control points by the above-mentioned control in the coordinate system in which the horizontal axis represents the clock frequency and the vertical axis represents the supply voltage, wherein black circles indicate the case where only the clock frequency is changed in FIG. 3A, and white circles indicate the case where the DVFS technique in FIG. 3B is applied. A range surrounded by a solid line indicates a range in which the circuit can operate.

In the operable range of the circuit in FIG. 3C, the closer to the boundary line of the lower limit, the smaller the power consumption is. Therefore, in order to reduce the power consumption, it is desirable to control so that the control point becomes closer to the lower limit of the operable range. In the case where the supply voltage is fixed at 1.2 V in FIG. 3A, the control point is close to the lower limit of the operable range when the clock frequency is 400 MHz, however, the control point becomes more distant from the lower limit of the operable range when the clock frequency is 200 MHz and 100 MHz.

In contrast, when the DVFS technique is applied, the supply voltage is 1.0 V when the clock frequency is 200 MHz the supply voltage is 0.8 V when the clock frequency is 100 MHz, and therefore, the control point becomes close to the lower limit of the operable range. In the state where there is no load, the supply voltage is set to 0 V and the clock frequency is set to 0 MHz, i.e., the state is brought about where no clock is supplied. This state is outside the operable range, however, no circuit block operates, and therefore, it does not cause any problem in particular.

As described above, in order to apply the DVFS technique, a mechanism is provided that generates various supply voltage values and supplies them to each circuit block, and the LDO regulators 15A and 15B change the supply voltage value in accordance with the control of the PMU 12.

In recent years, in order to further reduce power, a very low power source voltage, such as about 0.5 V, is applied in place of a high power source voltage, such as 1.2 V, which is applied from outside illustrated in FIG. 2A and FIG. 2B, and an LDO regulator that operates under such conditions is demanded.

FIG. 4A and FIG. 4B are diagrams illustrating circuit examples of the LDO regulator proposed hitherto, also illustrating together circuit blocks to which the power source voltage is supplied from the LDO regulator.

FIG. 4A is a circuit diagram of an analog type LDO regulator 20. For example, the first circuit block 11A in FIG. 2A corresponds to a circuit block 11 and the LDO regulator 15A corresponds to the analog type LDO regulator 20. The analog type LDO regulator 20 is illustrated as being provided outside in correspondence to the circuit block 11, however, it may be provided as a part of the circuit.

The analog type LDO regulator 15A has s supply transistor 21, a differential amplifier 22, and variable resistors 23 and 24. The supply transistor 21 is a PMOS transistor provided between a high-potential side global power source line 25 of a voltage VDD and a local power source line 26 of the circuit block 11, and an output GA of the differential amplifier 22 is applied to the gate thereof. The variable resistors 23 and 24 are connected in series between the local power source line 26 and a low-potential side power source line 27 of a voltage VSS (0 V) and form a variable voltage divider circuit configured to output a divided voltage of a voltage VDDMA of the local power source line 26 and the VSS. The resistance values of the variable resistors 23 and 24 differ in accordance with the DVFS mode. In other words, it is possible for the variable voltage divider circuit to change the resistance ratio in accordance with the DVFS mode. The differential amplifier 22 generates the output GA in accordance with a difference between a divided voltage MONA output from the variable voltage divider circuit and the reference potential VREF output from the VREF generation circuit 16 in FIG. 2A. Reference symbol "C" indicates a capacitor between the VDDMA and the VSS.

The differential amplifier 22 compares the divided voltage of the supply voltage VDDMA to the circuit block 11 and the VSS with the reference potential VREF, and determines whether or not the VDDMA is higher than the desired minimum voltage value (target value) for the circuit block 11 to operate by a potential comparison in an analog manner. Then, in accordance with the comparison result, if the VDDMA is lower than the target value, the output GA is controlled in an analog manner so that the amount of supply current of the supply transistor 21 is increased, and if the VDDMA is higher than the target value, the GA is controlled in an analog manner so that, on the contrary, the amount of supply current is reduced. Therefore, the VDDMA is kept at the target value at all times. The target value differs depending on the DVFS mode, and therefore, as described above, the resistance values of the variable resistors 23 and 24 are changed in accordance with the DVFS mode, and the resistance ratio of the variable voltage divider circuit can be changed. Consequently, it is possible for the LDO regulator 15A to dynamically change the supply voltage in order to keep the target value by changing the VDDMA toward the target value set for each DVFS mode.

The analog type LDO regulator is an LDO regulator widely used at present in the case where the power supply voltage VDD applied from outside is about 1.2 V.

However, in recent year, in order to further reduce power consumption, the power source voltage VDD is reduced to about 0.5 V and the VDDMA becomes about 0.4 V and the VREF is set to 0.25 V. If the VDD falls to as low as 0.5 V, it is difficult to perform gate potential control in an analog manner with precision because a threshold value of the transistor that forms the LDO regulator 15A is 0.4 V to 0.5 V, and therefore, the VDD enters a sub threshold region. The sub threshold region is a region in which the VDD becomes equal to or less than the threshold value.

Then, a digital type LDO regulator is proposed.

FIG. 4B is a circuit diagram of a digital type LDO regulator 30. FIG. 4B also illustrates together circuit blocks to which the power source voltage is supplied by the LDO regulator 30. For example, the first circuit block 11A in FIG. 2A corresponds to the circuit block 11 and the LDO regulator 15A corresponds to the digital type LDO 30. It may also be possible to provide the digital type LDO regulator 30 as part of the circuit block 11.

The basic configuration and operation of the digital type LDO regulator 30 are the same as those of the analog type LDO regulator 20 in FIG. 4A, however, the following points are different.

(1) The supply transistor 21 is formed by a plurality of supply transistors 21A, 21B, 21C, . . . connected in parallel.

(2) The differential amplifier 22 is replaced with a comparator 28 configured to output the comparison result as a digital value of 0 or 1.

(3) A controller 29 is provided that controls the turning on and off of the plurality of the supply transistors 21A, 21B, 21C, . . . in accordance with the output of the comparator 28.

If the VDDMA is lower than the target value, for example, the comparator 28 outputs "0" and the controller 29 performs control so as to increase the amount of supply current by increasing the number of the plurality of the turned-on supply transistors 21A, 21B, 21C, . . . . On the contrary, if the VDDMA is higher than the target value, the comparator 28 outputs "1" and the controller 29 performs control so as to reduce the amount of supply current by decreasing the number of the plurality of the turned-on supply transistors 21A, 21B, 21C, . . . .

By changing the control to the digital control as described above, the LDO regulator becomes to operate on a VDD level at which no erroneous operation of 0 or 1 does not occur, and therefore, the LDO regulator will operate accurately at the VDD lower than that of the analog type LDO regulator.

RELATED DOCUMENTS

[Patent Document 1] Japanese Laid Open Patent Document No. 2011-066791

[Non Patent Document 1] "0.5-V Input Digital LDO with 98.7% Current Efficiency and 2.7-μA Quiescent Current in 65 nm CMOS", Yasuyuki Okuma, et al., Custom Integrated Circuits Conference (CICC), Sep. 19-22, 2010

[Non Patent Document 3] "13% Power Reduction in 16b Integer Unit in 40 nm CMOS by Adaptive Power Supply Voltage Control with Parity-Based Error Prediction and Detection (PEPD) and Fully Integrated Digital LDO", Koji Hirairi, et al., International Solid-State Circuits Conference (ISSCC), Feb. 19-23, 2012

SUMMARY

According to an aspect of the embodiments, a semiconductor device includes: a plurality of circuit parts; a global power source configured to supply a power source voltage; a plurality of power source supply circuits configured to connect local power sources of the plurality of circuit parts and the global power source; and a plurality of local power source control circuits provided in correspondence to the plurality of circuit parts and configured to control the plurality of power source supply circuits so that voltage values of the local power sources of the plurality of circuit parts are desired values, wherein each of the plurality of power source supply circuits includes a plurality of discrete supply switches, each of the plurality of local power source control circuits includes: a voltage monitor circuit whose output characteristic value changes discretely in accordance with a change in the voltage value of the local power source; a storage circuit configured to store the output target characteristic value of the voltage monitor circuit when the voltage value of the local power source is a desired value; a comparator configured to compare the output characteristic value of the voltage monitor circuit and the target characteristic value; and a switch control circuit configured to control the number of the plurality of turned-on discrete supply switches based on the comparison result of the comparator.

The object and advantages of the embodiments will be realized and attained by means of the elements and combination particularly pointed out in the claims.

It is to be understood that both the foregoing general description and the following detailed description are exemplary and explanatory and are not restrictive of the invention.

BRIEF DESCRIPTION OF THE DRAWINGS

FIG. 15A is a diagram illustrating an example of the configuration of the controller in the second embodiment;

FIG. 15B is a diagram illustrating the operation of an up/down shift register;

FIG. 17 is a circuit diagram of the LDO regulator in the semiconductor device of the third embodiment;

FIG. 18A is a diagram illustrating an example of the configuration of the controller in the third embodiment;

FIG. 18B is a diagram illustrating the operation of an up/down shift register;

FIG. 20 is a time chart indicating the operation of the LDO regulator of the third embodiment.

DESCRIPTION OF EMBODIMENTS

Figure 5:
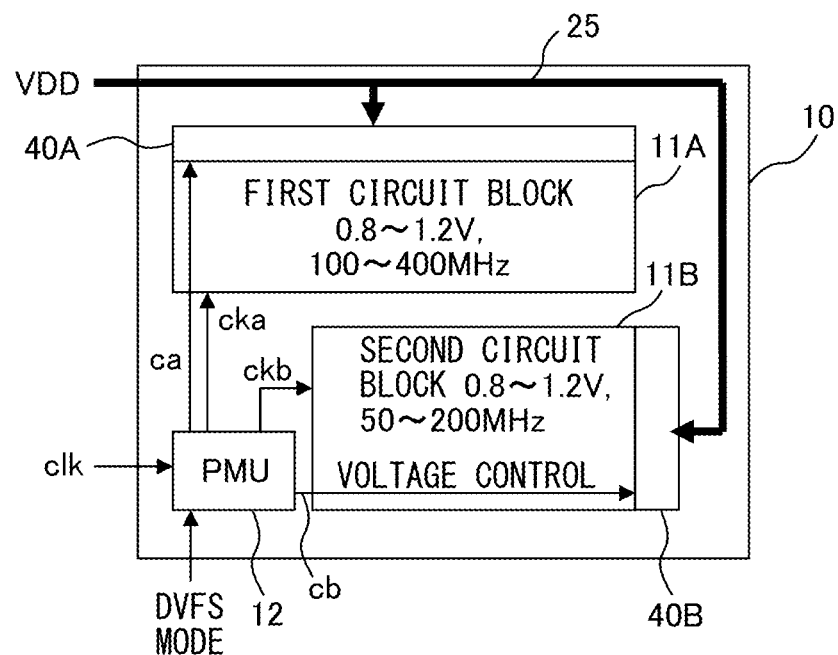
FIG. 5 is a diagram illustrating a schematic configuration of a semiconductor device (LSI) of a first embodiment.

FIG. 5 is a diagram illustrating the schematic configuration of a semiconductor device (LSI) of a first embodiment.

As illustrated in FIG. 5, the LSI 10 of the first embodiment has a plurality of circuit blocks including the first circuit block 11A and the second circuit block 11B, and the PMU 12.

The first circuit block 11A has a low drop out (LDO) regulator 40A. The second circuit block 11B has an LDO regulator 40B. The PMU 12 supplies the clock "cka" to the first circuit block 11A and also supplies the control signal "ca" of the supply voltage to the LDO regulator 40A. Further, the PMU 12 supplies the clock "ckb" to the second circuit block 11B and also supplies the control signal "cb" of the supply voltage to the LDO regulator 40B. The PMU 12 changes the frequency of the clock and the voltage to be supplied in accordance with the load state of each circuit block specified by the DVFS mode from outside, and controls each circuit block so as to reduce power consumption while keeping the desired processing speed.

Figure 1A:
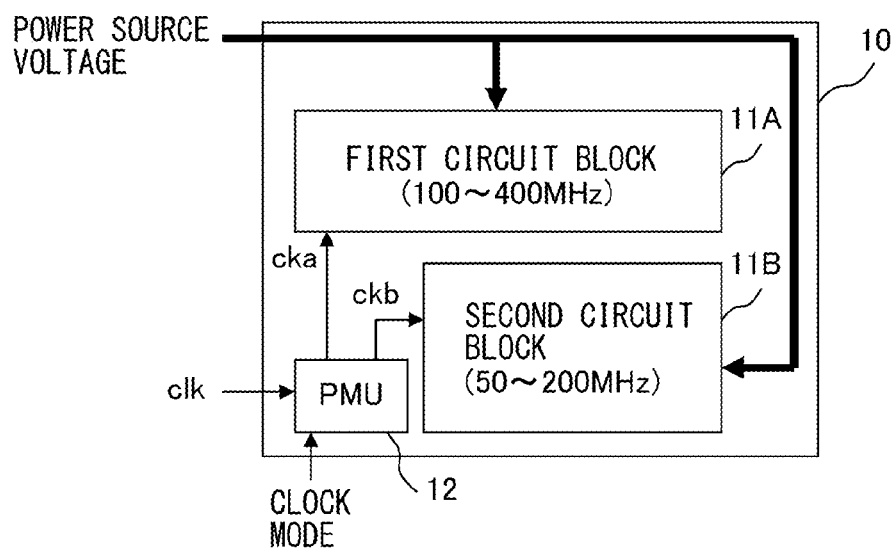
FIG. 1A is a diagram illustrating a schematic configuration of an LSI in which an operation frequency for each circuit part is changed.
Figure 1B:
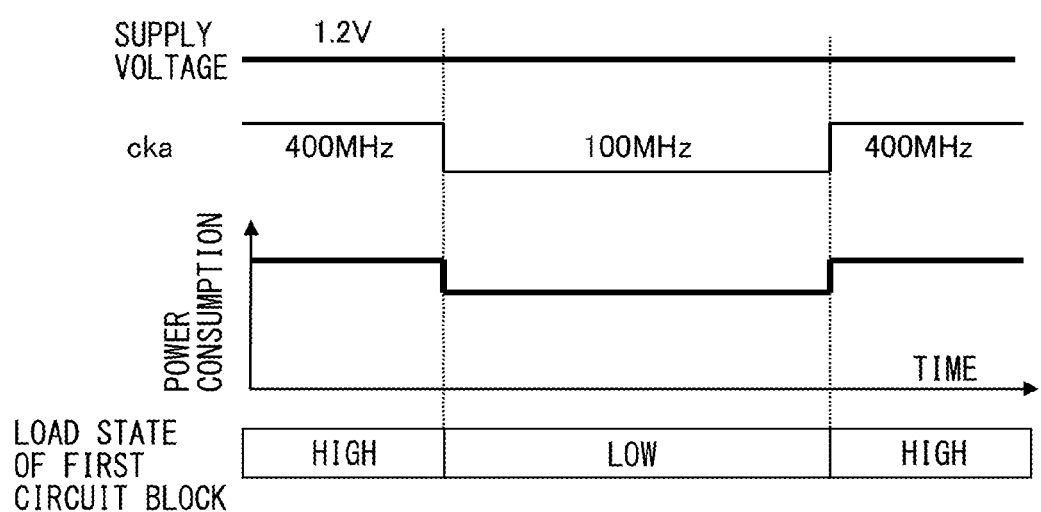
FIG. 1B is a diagram illustrating a time chart indicating the operation of the LSI illustrated in FIG. 1A.
Figure 2A:
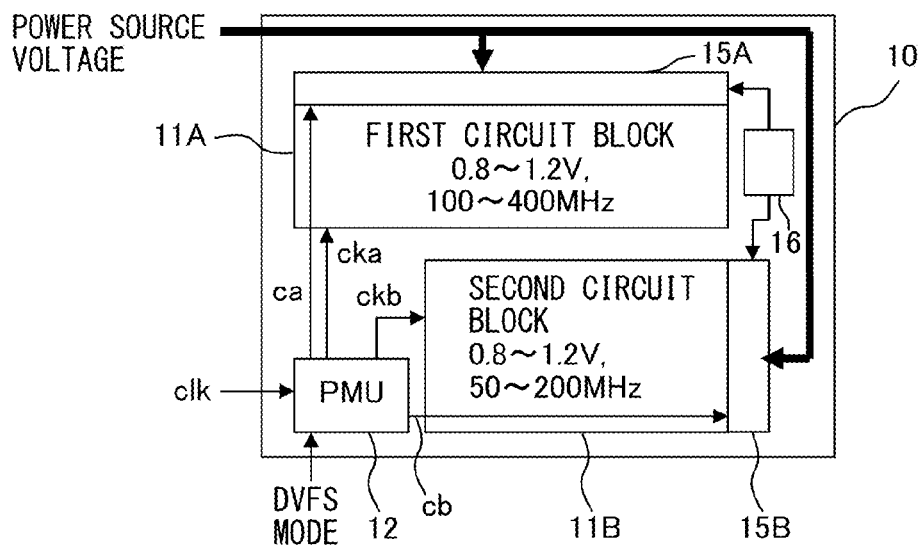
FIG. 2A is a diagram illustrating a schematic configuration of the LSI to which the DVFS technique is applied.
Figure 2B:
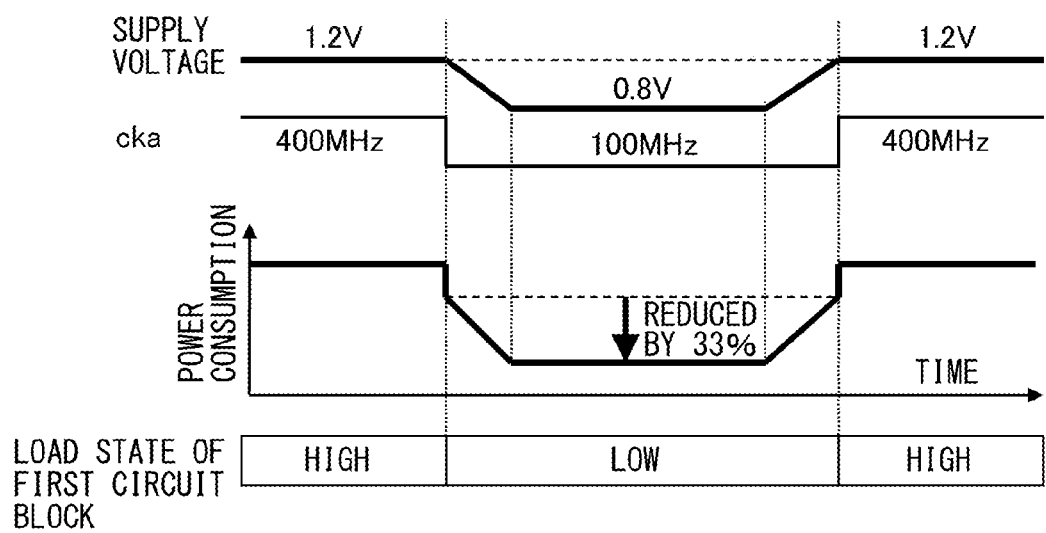
FIG. 2B is a diagram illustrating a time chart indicating an operation of the LSI illustrated in FIG. 2A.
Figures 3A, 3B, 3C:
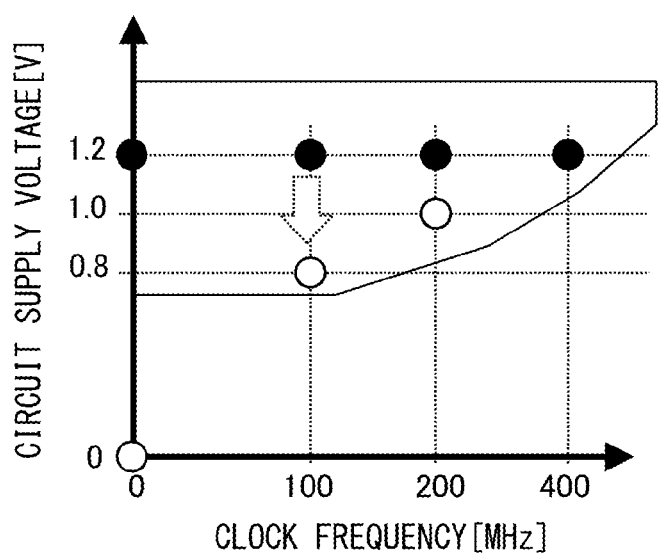
FIG. 3A to FIG. 3C are diagrams illustrating the changes in the clock frequency and in the supply voltage in accordance with the load of the first circuit block 11A of the LSI, in which only the clock frequency is changed as illustrated in FIG. 1A and FIG. 1B and the DVFS technique is applied.

As described above, the LSI 10 of the first embodiment has a configuration similar to that of the LSI illustrated in FIG. 2A, however, differs from it in that the VREF generation circuit 16 is not provided and in that the configurations of the LDO regulator 40A and the LDO regulator 40B are different from those of the LDO regulator 15A and the LDO regulator 15B. The first circuit block 11A except for the LDO regulator 40A, the second circuit block 11B except for the LDO regulator 40B, and the PMU 12 are the same as those in FIG. 2A, and therefore, explanation is omitted. Further, the LDO regulator 40A and the LDO regulator 40B have similar configurations and in the following, explanation is given by regarding them as an LDO regulator 40.

Figure 6:
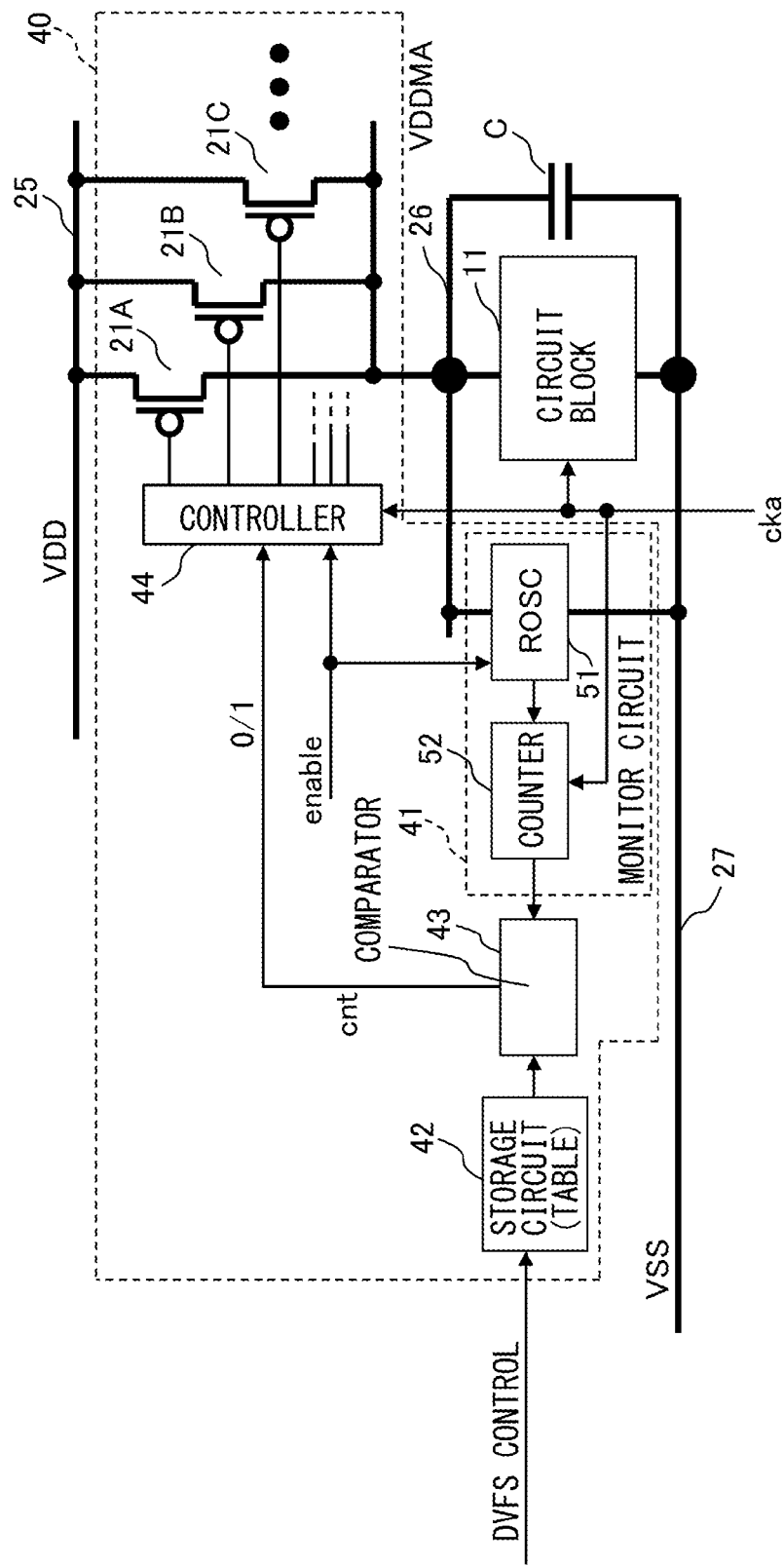
FIG. 6 is a circuit diagram of the LDO regulator in the first embodiment, also illustrating together the circuit block to which the power source voltage is supplied from the LDO regulator.

FIG. 6 is a circuit diagram of the LDO regulator 40 in the first embodiment, also illustrating together the circuit block 11 to which the power source voltage is supplied from the LDO regulator 40. In the circuit diagram of the LDO regulator 40 below, there is also a case where the circuit block 11 is illustrated together. For example, the first circuit block 11A in FIG. 5 corresponds to the circuit block 11 and the LDO regulator 15A corresponds to the LDO regulator 40. It may also be possible to provide the LDO regulator 40 as part of the circuit block 11.

The LDO regulator 40 in the first embodiment has a plurality of the supply transistors 21A, 21B, 21C, . . . , a monitor circuit 41, a storage circuit (selection table) 42, a comparator 43, and a controller 44.

Each of the plurality of the supply transistors 21A, 21B, 21C, . . . is a PMOS transistor provided in parallel between the high-potential side power source line 25 of the voltage VDD and the local power source line 26 of the circuit block 11. The turning on and off of the plurality of the supply transistors 21A, 21B, 21C, . . . are controlled by the control signal from the controller 44 that is applied to the gate thereof. Although depending on the load state of the circuit block 11, the basic operation is such that as the number of the plurality of the turned-on supply transistors 21A, 21B, 21C, . . . increases, the voltage VDDMA of the local power source line 26 of the circuit block 11 rises, and as the number of the turned-on transistors decreases, the VDDMA drops.

The monitor circuit 41 is a circuit in which the characteristic value of the output changes discretely in accordance with the change in the voltage VDDMA of the local power source line 26. For example, as illustrated schematically, the monitor circuit 41 is formed by a ring oscillator (ROSC) 51 and a counter 52 configured to count the number of pulses during a predetermined period of time of an oscillation signal output from the ROSC 51.

The ring oscillator (ROSC) 51 is a circuit that oscillates by itself and in which an odd number of gates that operate as an inverter is connected in series and the output of the final stage is caused to be input to the initial stage, and the oscillation frequency is determined by an amount of delay of one gate. The amount of delay of one gate changes in accordance with the power source voltage, and therefore, the oscillation frequency of the ORSC 51 changes in accordance with the voltage VDDMA of the local power source line 26. The ROSC 51 performs the oscillation operation during the period during which an enable signal enable is enabled and stops the oscillation operation during the period during which the signal is disabled.

The counter 52 counts the number of pulses during a predetermined period of time of the oscillation signal output from the ROSC 51 and outputs a count value. The predetermined period of time is, for example, one period or half the period of the clock "cka" supplied from the PMU 12 to the circuit block 11. Consequently, the count value output from the counter 52, i.e., the output of the monitor circuit 41 changes discretely in accordance with the change in the voltage VDDMA of the local power source line 26. In other words, the output of the monitor circuit 41 is a digital value that changes in accordance with the VDDMA.

As described above, the output of the monitor circuit 41 is a digital value that changes discretely in accordance with the VDDMA and as a result, it is possible to determine the voltage value VDDMA by digital processing without performing processing of an analog signal by a comparator, etc. In FIG. 6, the example of the monitor circuit 41 formed by the ROSC 51 and the counter 52 is illustrated, however, any monitor circuit may be used as long as it is a circuit that outputs a digital value that changes discretely in accordance with the VDDMA.

The storage circuit 42 stores the count value output from the monitor circuit 41 when the VDDMA is the target value as a table set value (reference count number). In the case where control is performed so that the VDDMA takes a plurality of different target values by the DVFS control, the storage circuit 42 stores a plurality of table set values in a table form in correspondence to the DVFS control signal and outputs the corresponding table set value in accordance with the DVFS control signal.

The comparator 43 determines whether the count value output from the monitor circuit 41 is larger or smaller than the table set value output from the storage circuit 42 and outputs a determination result "cnt" of "0" or "1" to the controller.

The controller 44 increases the number of the plurality of the turned-on supply transistors 21A, 21B, 21C, ... by one if the count value output from the monitor circuit 41 is smaller than the table set value, i.e., if the VDDMA is lower than the voltage value, which is the target of the DVFS control. Further, the controller 44 decreases the number of the plurality of the turned-on supply transistors 21A, 21B, 21C, ... by one if the count value output from the monitor circuit 41 is larger than the table set value, i.e., if the VDDMA is higher than the voltage value, which is the target of the DVFS control. The controller 44 performs the above operation in synchronization with the clock "cka" during the period during which the enable signal enable is enabled.

When the number of the plurality of the turned-on supply transistors 21A, 21B, 21C, ... increases by one, the VDDMA rises and when the number decreases by one, the VDDMA drops. Consequently, by repeating the above-mentioned operation in accordance with the clock "cka", the VDDMA approaches the target value and in the case where the VDDMA becomes stable thereafter, the increasing by one and the decreasing by one in the number of the plurality of the turned-on supply transistors 21A, 21B, 21C, ... are repeated.

Figure 7:
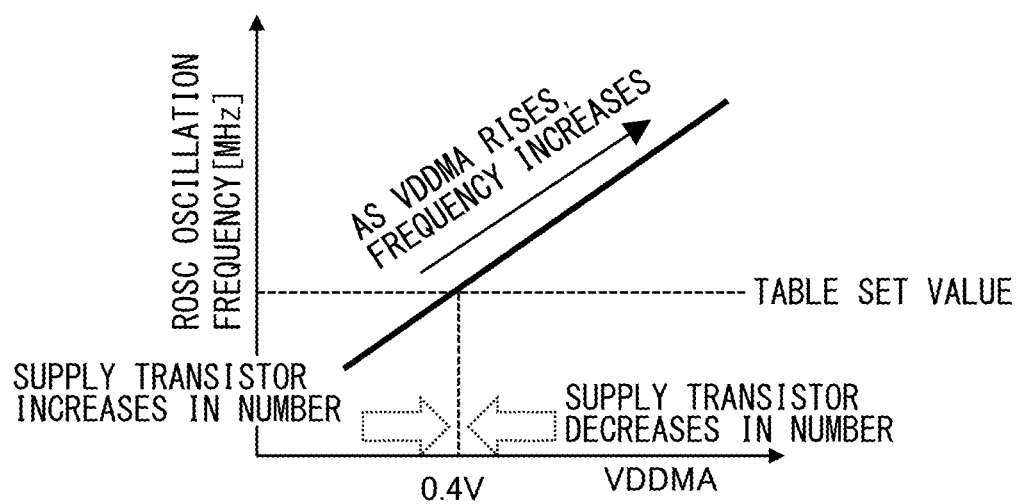
FIG. 7 is a diagram for explaining control processing in the LDO regulator.

FIG. 7 is a diagram for explaining control processing in the LDO regulator 40. In FIG. 7, the horizontal axis represents the power source voltage VDDMA and the vertical axis represents the oscillation frequency of the ROSC 51. The oscillation frequency of the ROSC 51 has a relationship with the VDDMA in which it monotonically increases as the VDDMA increases. In order to simplify explanation, in FIG. 7, the relationship between the oscillation frequency of the ROSC 51 and the VDDMA is illustrated as being a direct proportional relationship. For example, 0.4 V is the target value of the VDDMA and the count value of the counter 52 corresponding to the oscillation frequency of the ROSC 51 at that time is stored as a table set value of the storage circuit 42.

When the enable signal "enable" is enabled, the ROSC 51 starts its oscillation operation and the counter 52 outputs the count value of the number of pulses of the ROSC 52 during one period or half the period of the "cka". When the comparator 43 determines that the count value is lower than the table set value, the controller 44 increases the number of the plurality of the turned-on supply transistors 21A, 21B, 21C, ... by one. Consequently, the VDDMA rises. If the count value during the next period of the "cka" is still lower than the table set value, the number of the plurality of the turned-on supply transistors 21A, 21B, 21C, ... is increased by one. By repeating such an operation, the VDDMA rises up to 0.4 V. If the VDDMA rises and exceeds 0.4 V, the count value becomes higher than the table set value. Consequently, the comparator 43 determines that the count value is higher than the table set value and the controller 44 decreases the number of the plurality of the turned-on supply transistors 21A, 21B, 21C, ... by one. After this, such an operation is repeated. In the case where the initial count value is higher than the table set value, the operation opposite to the above-mentioned operation is performed.

There exists a time delay from when the counter 52 counts the oscillation pulses of the ROSC 51 until the number of the plurality of the turned-on supply transistors 21A, 21B, 21C, ... increases or decreases, the VDDMA changes, and the oscillation frequency of the ROSC 51 changes. Consequently, as will be described later, in the first embodiment, a count is taken during the first half period of the "cka" and the number of the turned-on supply transistors is controlled during the second half period. However, it may also be possible to perform the count operation of the counter 52 during one period in two periods of the "cka" and to perform the control operation by the controller 44 during one remaining period of the two periods of the "cka" so that the control operation is shifted from the count operation by one period.

Further, in the case where the storage circuit 42 stores a plurality of different table set values in the table form, the storage circuit 42 outputs the table set value selected in accordance with the DVFS control signal and performs the same operation as that described above.

As described above, all of the processing in the LDO regulator 40 is performed by digital signal processing. If this is compared with the digital type LDO regulator 30 illustrated in FIG. 4B, the comparator 28 to compare two analog potentials is not provided and only the comparison between the magnitudes of digital signals is made, and therefore, an LDO regulator capable of the operation at a lower voltage is formed. Further, the capacitor element to protect the potentials to be compared from noise and the resistor element to configure a variable voltage divider circuit are no longer provided, and therefore, there is an effect that the area occupied by the chip can be reduced.

Figure 8:
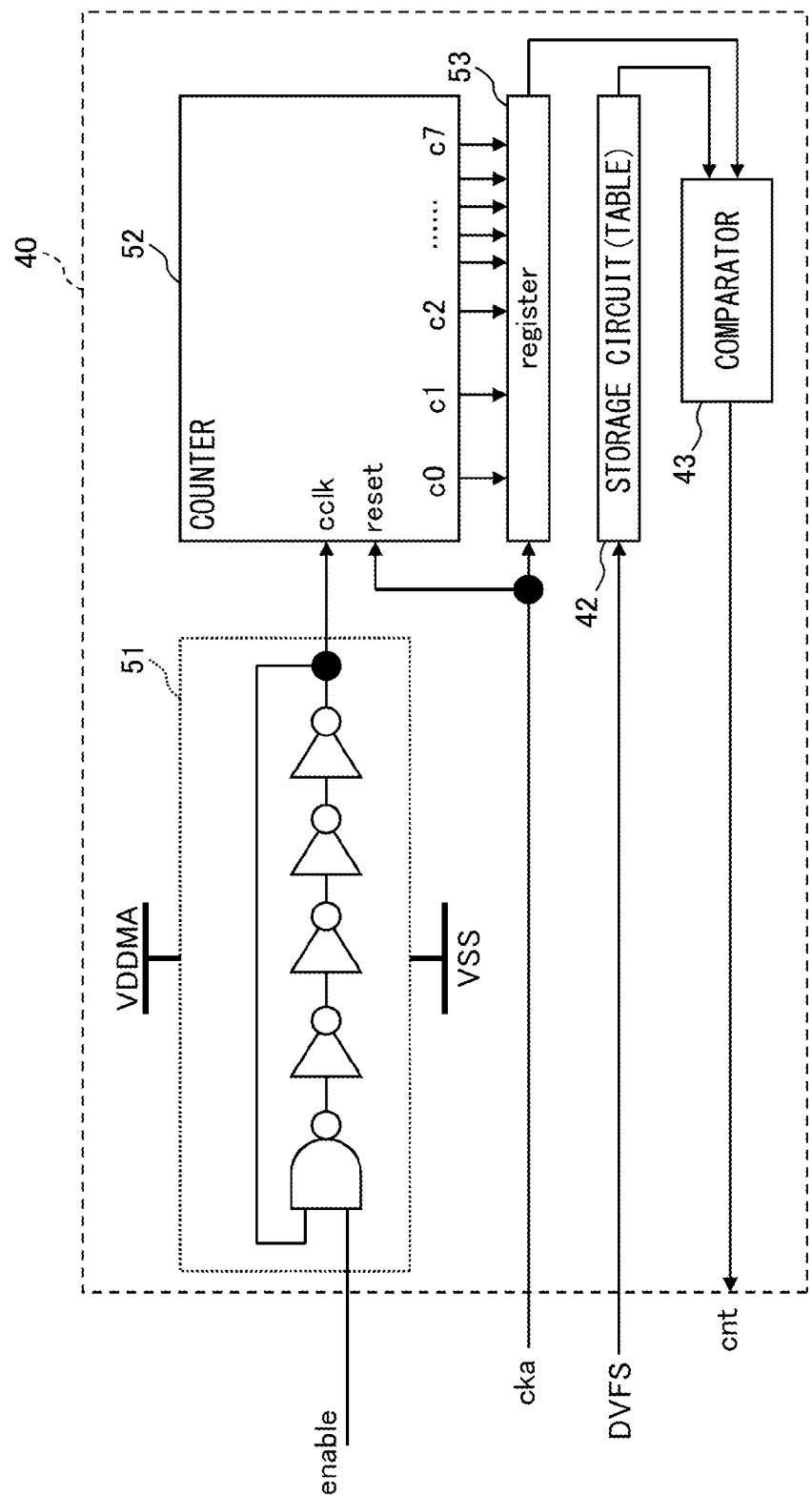
FIG. 8 is diagram illustrating the configuration of the ROSC and the counter in more detail in the LDO regulator of the LSI of the first embodiment, illustrating the portion excluding the supply transistors.

FIG. 8 is diagram illustrating the configuration of the ROSC 51 and the counter 52 in more detail in the LDO regulator 40 of the LSI 10 of the first embodiment, illustrating the portion excluding the supply transistors.

The ROSC 51 is formed by inverters that use the VDDMA as a high-potential side power source and the VSS as a low-potential side power source, and a NAND gate. One NAND gate is used as the initial stage and the four inverters are connected in series, and the output of the inverter in the final stage is input to one of the NAND gates and at the same time, the output is input to the counter 52 as an oscillation clock "cclk". To the other NAND gate, the enable signal "enable" is input. If the "enable" is enabled (high (H)), the NAND gate operates as an inverter and a ring oscillator in which inverters in five stages are connected in the form of a ring is formed and the ring oscillator oscillates by itself. If the "enable" is disabled (low (L)), the output of the NAND gate does not change, and therefore, the oscillation stops. For example, when stopping the LDO regulator 40, the ROSC 51 does not oscillate, and therefore, in order to suppress wasteful power consumption by the ROSC 51, the "enable" is disabled to stop the oscillation.

The counter 52 counts how many times the ROSC 51 outputs the oscillation clock "cclk" during the reference period of time. The reference period of time is one period of the reference clock "cka" supplied from the PMU 12. The counter 52 performs the count operation of the "cclk" during the second half period ("cka"="L") of the "cka" and stores the count value in a register 53 when the first half period ("cka"="H") is entered and the count value is reset during the first half period. In FIG. 8, the register 53 is provided outside the counter 52, however, it may also be provided within the counter 52. During the first half period, the comparator 43 compares the counter value of the register 53 with the table set value output from the storage circuit 42, and the controller 44 increases or decreases the number of the turned-on supply transistors based on the comparison result.

Figure 9:
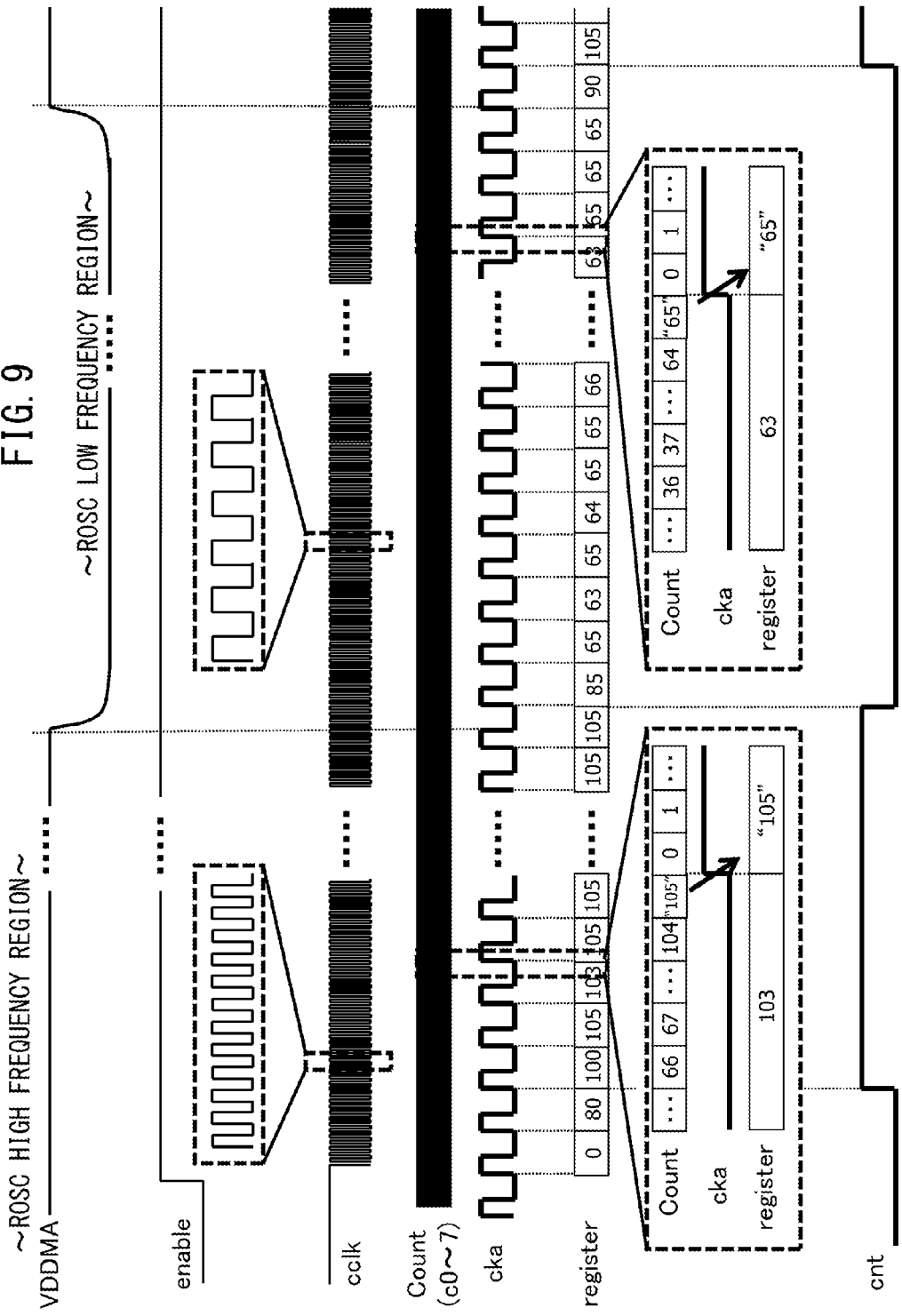
FIG. 9 is a time chart indicating an example of the operation of the ROSC, the counter, the register, and the comparator of the LDO regulator of the first embodiment.

FIG. 9 is a time chart indicating an example of the operation of the ROSC 51, the counter 52, the register 53, and the comparator 43 of the LDO regulator 40 of the first embodiment. This time chart indicates the operation of the ROSC 51, the counter 52, the register 53, and the comparator 43, but does not reflect the feedback to the VDDMA based on the determination result by the controller 44. In FIG. 9, the operation on the assumption that at first, the VDDMA is high and then, the VDDMA falls, and further the VDDMA rises again is indicated. The table set value is set to "95" and if the count value of the register 53 is smaller than "95", the determination result "cnt" will be "0" and if the count value is larger than "95", the determination result "cnt" will be "1".

While the enable signal "enable" is disabled ("L (Low)"), the ROSC 51 is at rest, and therefore, the oscillation clock "cclk" is fixed to "H (High)", the count value is "0", and the determination result "cnt" is "0". When the enable signal "enable" changes to the enabled state (H), the ROSC 51 starts the oscillation operation, however, the oscillation frequency does not increase immediately, and therefore, it requires several periods of the "cka" until the count value increases. As illustrated in FIG. 9, in which a part of the oscillation clock "cclk" is enlarged, the cclk is a high-frequency oscillation signal. In FIG. 9, the count value increases to "80", "100", and "105". When the count value reaches "100", the determination result "cnt" changes to "1". Here, the count value temporarily changes to "103", however, it changes to "105" again. The changes in the count value of the counter 52 and in the value of the register 53 when the count value changes from "103" to "105" are illustrated by enlarged views. In the register 53, the previous count value "103" is held and when the count value of the counter 52 reaches "105", the reference clock "cka" rises and the register 53 latches the new count value "105". After this, the same operation is repeated, and the determination result "cnt" maintains "1".

When the VDDMA falls, the count value decreases to "85" and "65". As illustrated in FIG. 9, in which a part of the oscillation clock "cclk" is enlarged, the "cclk" in this case is an oscillation signal having a lower frequency compared to that of the above-mentioned "cclk". When the count value reaches "85", the determination result "cnt" changes to "0". Here, after the count value reaches "65", the count value changes in the vicinity of "65". The changes in the count value of the counter 52 and in the value of the register 53 when the count value changes from "63" to "65" are illustrated by enlarged views. In the register 53, the previous count value "63" is held and when the count value of the counter 52 reaches "65", the reference clock "cka" rises and the register 53 latches the new count value "65". After this, the same operation is repeated. In the meanwhile, the determination result "cnt" maintains "0". After that, the VDDMA rises and when the count values reaches and exceeds "95", the determination result "cnt" changes to "1" again.

Figure 10:
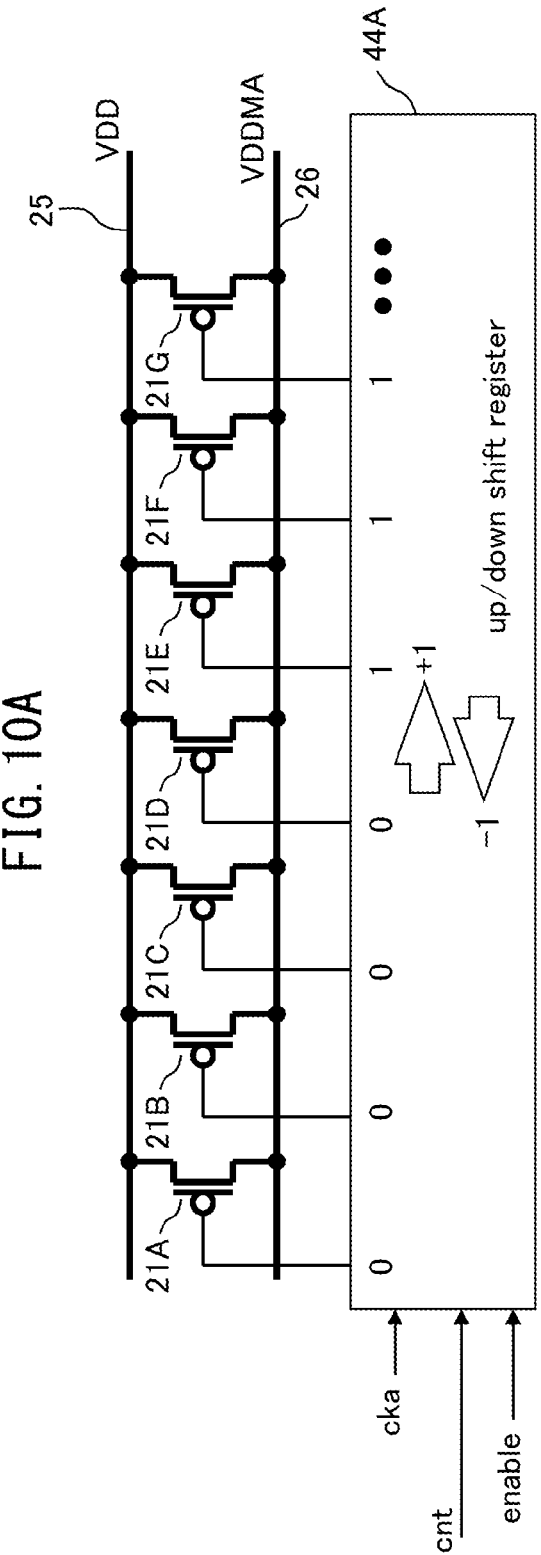
FIG. 10A illustrates an example of the configuration of the controller, also illustrating together a plurality (here, seven) of supply transistors.
FIG. 10B is a diagram illustrating the operation of an up/down shift register.

FIG. 10A illustrates an example of the configuration of the controller 44, also illustrating together a plurality (here, seven) of supply transistors 21A to 21G. FIG. 10B is a diagram illustrating the operation of an up/down shift register 44A corresponding to the controller.

In the configuration example in FIG. 10A, the controller 44 is implemented by the publicly-known up/down shift register 44A. As illustrated in FIG. 10B, while the enable signal enable "enable" is "1", the up/down shift register 44A increases the number of the supply transistors to be turned on by one if the "cnt" is "0" at the rise of the "cka", and decreases the number of the transistors to be turned on by one if the "cnt" is "1". Specifically, the supply transistors 21A to 21G are PMOS transistors and turn on when the output of the up/down shift register 44A is "0" and turn off when it is "1". In the up/down shift register 44A, outputs on the left side are "0" and outputs on the right side are "1", and the position where "0" or "1" changes to "1" or "0" is shifted toward the right side when the "cnt" is "0" and shifted toward the left side when the "cnt" is "1". Further, when the enable signal "enable" is disabled ("0"), the up/down shift register 44A resets all the outputs to "1" and turns off all the supply transistors 21A to 21G.

Figure 11:
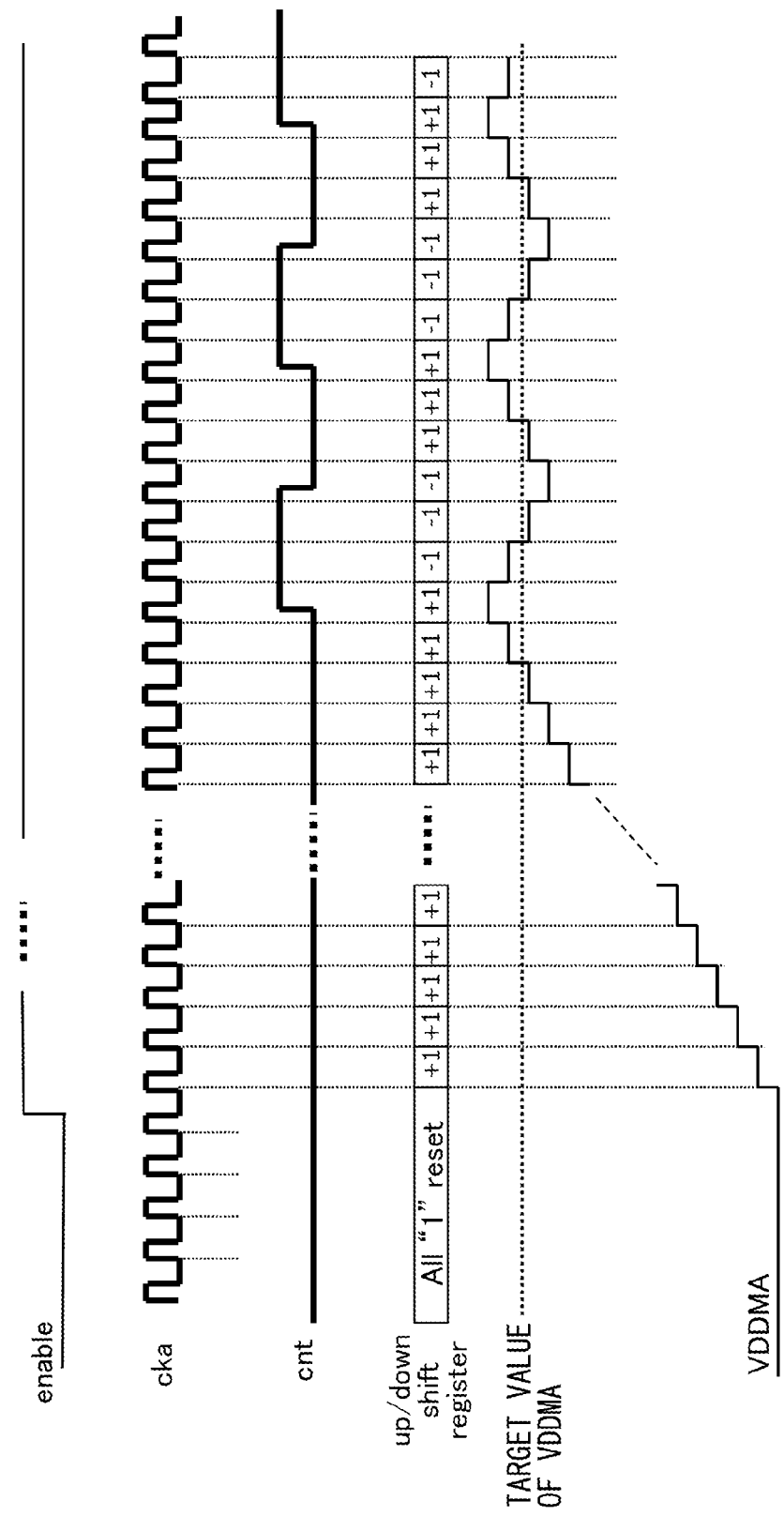
FIG. 11 is a time chart illustrating the operation of the up/down shift register in FIG. 10A.

FIG. 11 is a time chart indicating the operation of the up/down shift register 44A in FIG. 10A.

When the enable signal "enable" is in the disabled state ("0"), all the outputs of the up/down shift register 44A are reset to "1". Consequently, all the supply transistors 21A to 21G are in the off state and the VDDMA becomes a state close to the VSS (0 V).

When the enable signal "enable" turns to "1", the ROSC 51 starts its oscillation, however, because the VDDMA is lower than the target value, the oscillation frequency is low and "cnt"=0, and therefore, the value of the up/down shift register 44A is incremented (+1) at each rise edge of the "cka". Because of this, the number of the turned-on supply transistors increases, the VDDMA rises, and when the VDDMA exceeds the target value, the "cnt" changes to "1" ("cnt"="1"), thereby the value of the up/down shift register 44A is decremented (−1) and the number of the turned-on supply transistors is decreased. Thus, the VDDMA drops. Further, when the VDDMA falls below the target value, the "cnt" changes to "0" ("cnt"="0") again, the value of the up/down shift register 44A is incremented (+1), and the number of the turned-on supply transistors is increased. By repeating this operation, the VDDMA is kept in the vicinity of the target value.

Figure 12:
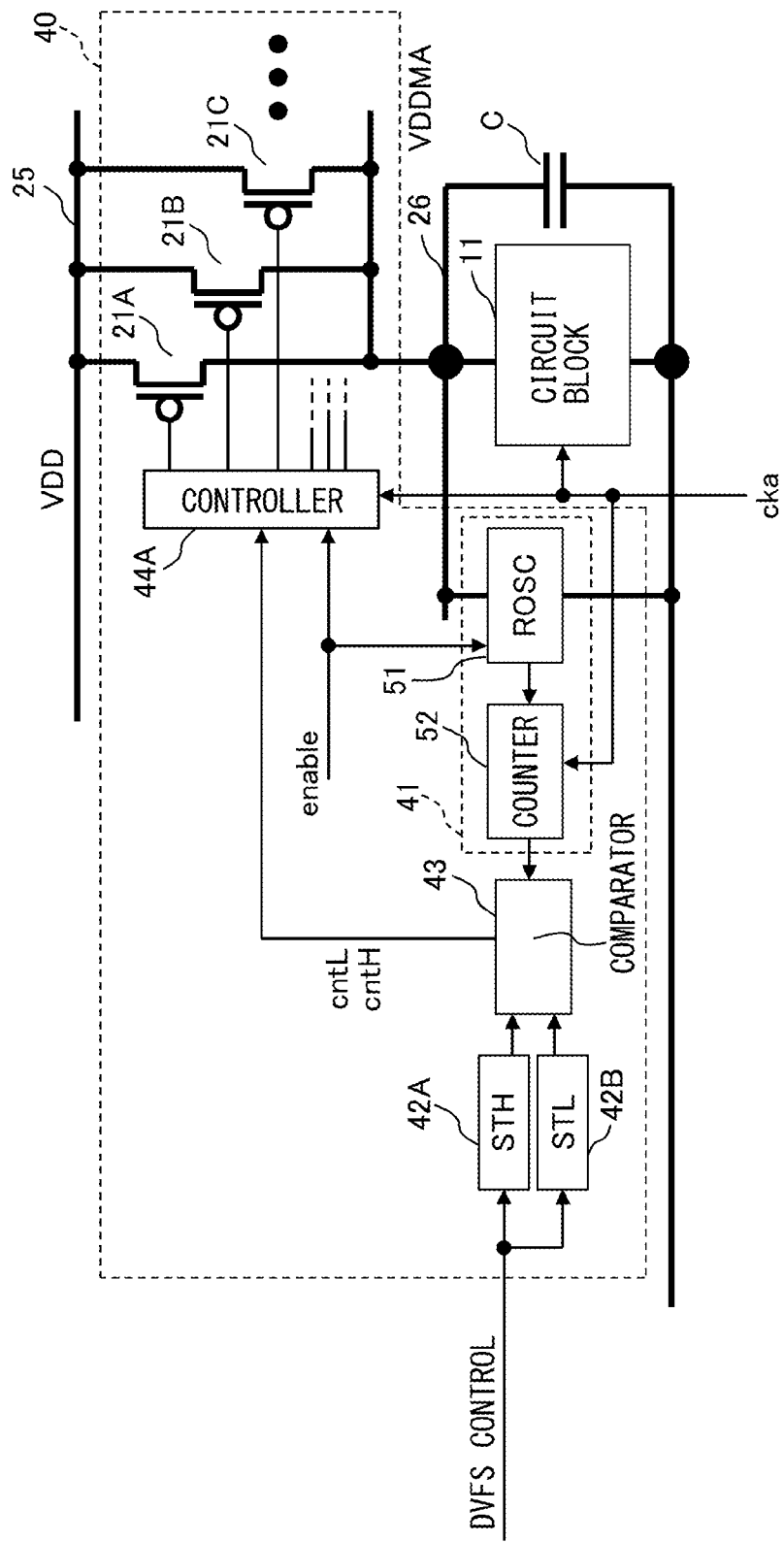
FIG. 12 is a circuit diagram of the LDO regulator in the semiconductor device of the second embodiment.

FIG. 12 is a circuit diagram of the LDO regulator 40 in the semiconductor device of the second embodiment. The semiconductor device of the second embodiment has a configuration similar to the general configuration of the semiconductor device of the first embodiment illustrated in FIG. 5, however, differs in the portion of the LDO regulator.

In the LDO regulator 40 in the first embodiment, the storage circuit 42 outputs one table set value in accordance with the DVFS control signal. In contrast to this, the LDO regulator 40 in the second embodiment has two storage circuits 42A and 42B and the storage circuit 42A outputs one high-level side (STH) set value and the storage circuit 42B outputs one low-level side (STL) set value in accordance with the DVFS control signal. The STL set value is smaller than the STH set value (STL set value<STH set value). Then, the comparator 43 compares the number of output pulses of the ROSC 51 during a predetermined period of time output from the monitor circuit 41 with the STH set value and the STL set value, respectively, and outputs two comparison results "cntH" and "cntL". The controller increases the number of the turned-on supply transistors when both the "cntH" and the "cntL" are "0", and decreases the number of the turned-on supply transistors when both the "cntH" and the "cntL" are "1". Then, in other cases, i.e., when "cntH"="0" and "cntL"="1", the controller maintains the number of the turned-on supply transistors (does not change the number). Other parts are the same as those of the LDO regulator of the first embodiment.

Figure 13:
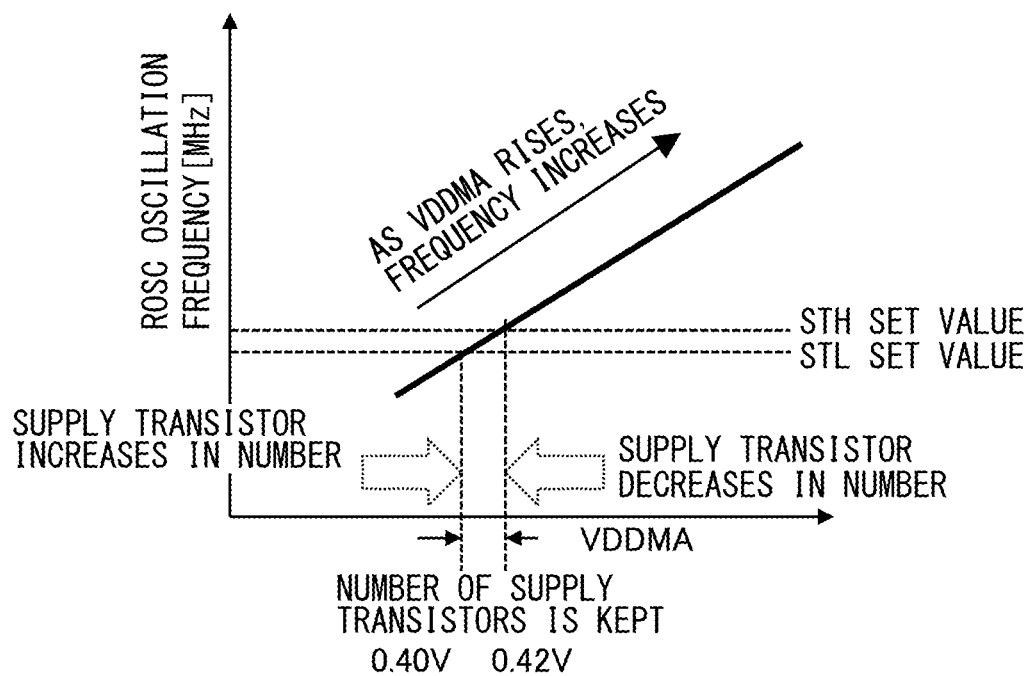
FIG. 13 is a diagram for explaining control processing in the LDO regulator in the second embodiment.

FIG. 13 is a diagram for explaining control processing in the LDO regulator 40 in the second embodiment, a diagram corresponding to FIG. 7. For example, if the target is to control the VDDMA so as to be between 0.40 V and 0.42 V. Then, the STL set value and the STH set value are determined in correspondence to the count values of the counter 52 corresponding to the oscillation frequencies of the ROSC 51 at the time of 0.40 V and 0.42 V and stored as the table set values of the storage circuits 42A and 42B. The STL set value and the STH set value are set as described above, and therefore, the STL set value is smaller than the STH set value (STL set value<STH set value).

When the comparator 43 determines that the count value of the counter 52 is lower than the STL set value, the controller 44 increases the number of the plurality of the turned-on supply transistors 21A, 21B, 21C, . . . by one. At this time, the STL set value is smaller than the STH set value (STL set value<STH set value), and therefore, the comparator 43 determines that the count value of the counter 52 is lower than the STL set value. This causes the VDDMA to rise. If the count value during the next period of the "cka" is still lower than the STL set value, the number of the plurality of the turned-on supply transistors 21A, 21B, 21C, . . . is increased by one. By the repetition of such an operation, the VDDMA rises up to 0.4 V.

When the comparator 43 determines that the count value of the counter 52 is higher than the STH set value, the controller 44 decreases the number of the plurality of the turned-on supply transistors 21A, 21B, 21C, . . . by one. At this time, the STL set value is smaller than the STH set value (STL set value<STH set value), and therefore, the comparator 43 determines that the count value of the counter 52 is higher than the STL set value. This causes the VDDM to drop. If the count value during the next period of the "cka" is still higher than the SHT set value, the number of the plurality of the turned-on supply transistors 21A, 21B, 21C, . . . is decreased by one. By the repetition of such an operation, the VDDMA drops to 0.42 V.

When the comparator 43 determines that the count value of the counter 52 is higher than the STL set value and lower than the STH set value, the controller 44 maintains the number of the plurality of the turned-on supply transistors 21A, 21B, 21C, . . . .

After this, such an operation is repeated. Because of this, the VDDMA is kept between 0.40 V and 0.42 V.

Figure 14:
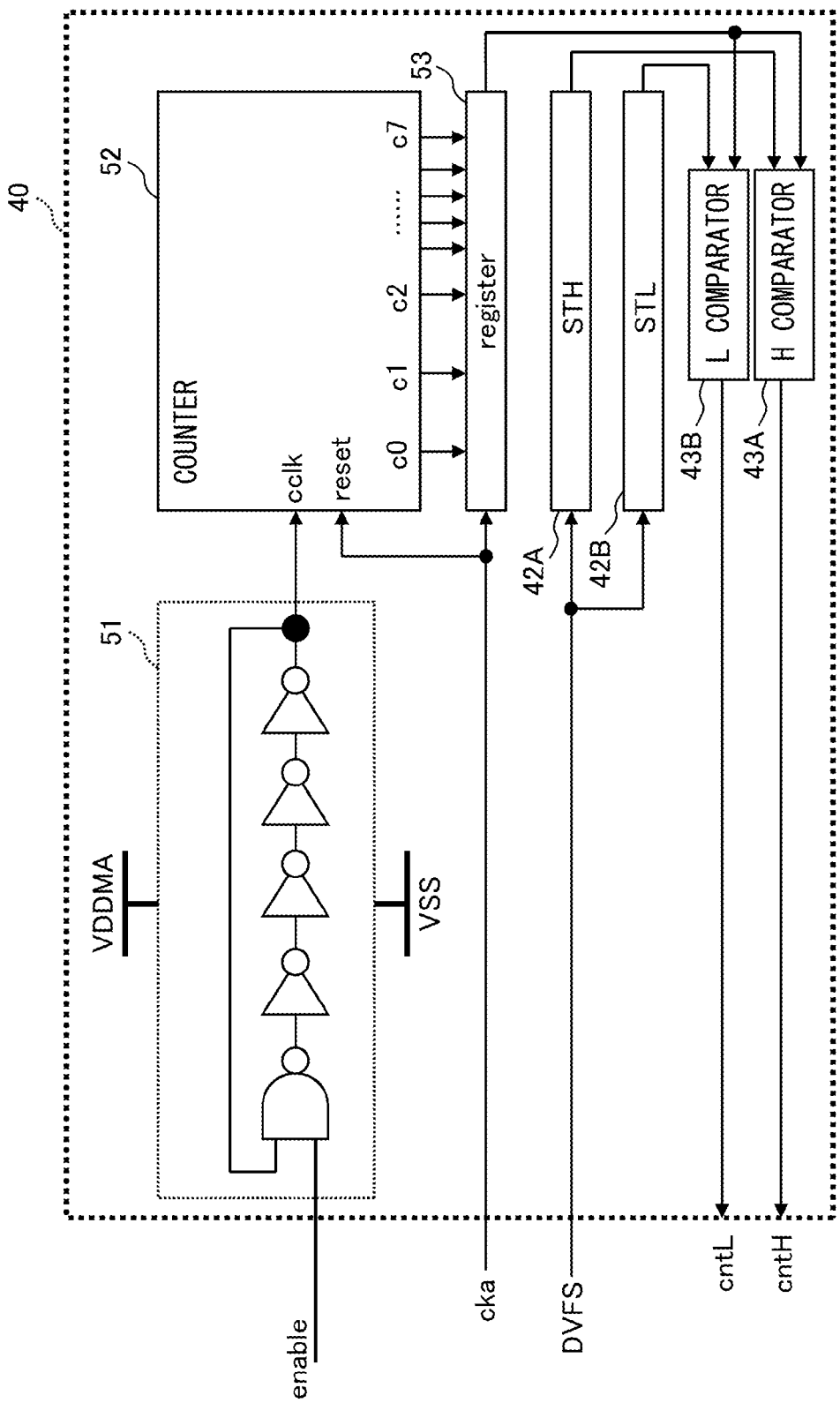
FIG. 14 is a diagram illustrating the configuration of the portion formed by the ROSC, the counter, the storage circuits, and the comparator in the LDO regulator of the LSI of the second embodiment in more detail.

FIG. 14 is a diagram illustrating the configuration of the portion formed by the ROSC 51, the counter 52, the storage circuits 42A and 42B, and the comparator 43 in the LDO regulator 40 of the LSI of the second embodiment in more detail.

The ROSC 51, the counter 52, and the register 53 are the same as those of the first embodiment in FIG. 8, and therefore, explanation is omitted. The two storage circuits 42A and 42B output the STH set value and the STL set value, respectively, in accordance with the DVFS control signal. In the second embodiment also, the storage circuits 42A and 42B store a plurality of the STH set values and the STL set values, respectively, in the table form in correspondence to the DVFS, and output the corresponding STH set value and STL set value in accordance with the DVFS.

The comparator 43 includes two comparators 43A and 43B. The comparator 43A outputs "cntH"="1" if the count value output from the register 53 is larger than the STH set value output from the storage circuit 42A, and outputs "cntH"="0" if the count value is smaller than the STH set value.

FIG. 15A illustrates an example of the configuration of the controller 44 in the second embodiment and FIG. 15B is a diagram illustrating the operation of an up/down shift register 44B.

In the configuration example in FIG. 15A, the controller 44 is formed by the up/down shift register 44B and a clock gate 45. The clock gate 45 allows the "cka" to pass when the enable signal "enable"="1", "cntL" and "cntH"="0" or "cntL" and "cntH"="1", and enters the stop state to block the "cka" when "enable"="1", "cntL"="1, and "cntH"="0". Consequently, an output "cka'" of the clock gate 45 is the "cka" when "enable"="1", "cntL" and "cntH"="0" or "cntL" and "cntH"="1", and is fixed and does not change when "enable"="1", "cntL"="1", and "cntH"="0".

The up/down shift register 44B increases the number of the supply transistors to be turned on by one if "cntL" and "cntH"="0" at the rise of the "cka" while the enable signal "enable" is enabled ("enable"="1"), and decreases the number of the transistors to be turned on by one if "cntL" and "cntH"="1". Further, the up/down shift register 44B maintains the shift state because the "cka" is not supplied if "cntL"="1" and "cntH"="0" while the enable signal "enable" is enabled ("enable"="1").

Further, the up/down shift register 44B resets all the outputs to "1" and turns off all the supply transistors 21A to 21G when the enable signal "enable" is disabled ("enable"="0"). At this time, the clock "cka" is not supplied to the up/down shift register 44B, and therefore, the clock gate 45 may enter the stop state, i.e., may block the "cka".

Figure 16:
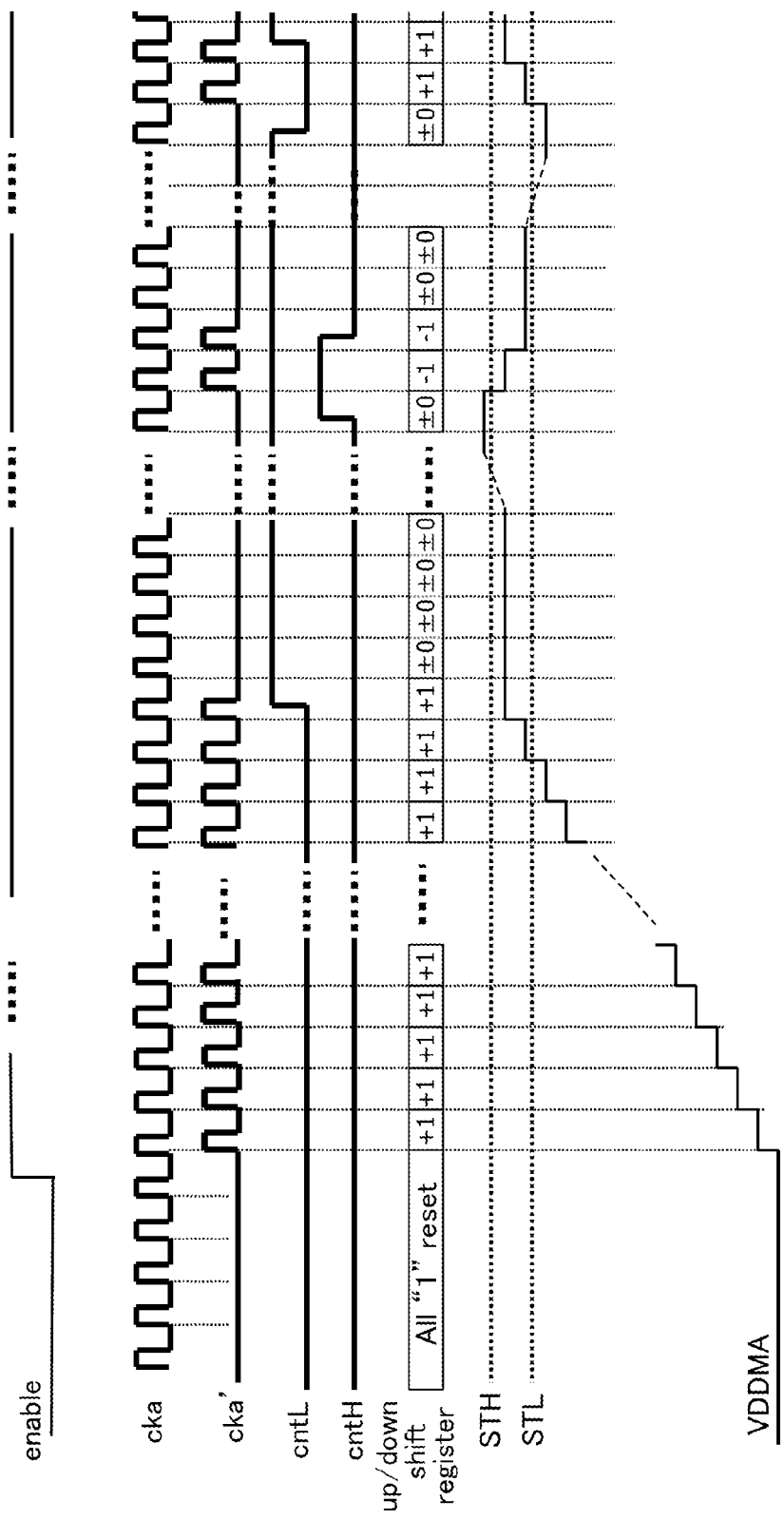
FIG. 16 is a time chart illustrating the operation of the controller in FIG. 15A

FIG. 16 is a time chart indicating the operation of the controller 44 in FIG. 15A.

When the enable signal "enable" is in the disabled state ("enable"="0"), all the outputs of the up/down shift register 44B are reset to "1". Consequently, all the supply transistors 21A to 21B are in the off state and the VDDMA becomes a state close to the VSS (0 V). At this time, in FIG. 16, the clock gate 45 is in the stop state and the "cka'" is illustrated as being fixed.

When the enable signal "enable" turns to "1", the ROSC 51 starts its oscillation, however, the VDDMA is lower than the target value, and therefore, the oscillation frequency is low, and "cntL"="0" and "cntH"="0". Because of this, at each rise edge of "cka", the value of the up/down shift register 44B is incremented (+1). This causes the number of the turned-on supply transistors to increase, and the VDDMA rises and exceeds the target value (0.40 V). At this time, the "cntL" changes to "1" ("cntL"="1"), however, "cntH" is kept at "0" ("cntH"="0"), and therefore, the clock gate 45 blocks the "cka", the value of the up/down shift register 44B is kept, and the number of the turned-on supply transistors is also kept.

Further, when the VDDMA exceeds the high-level side target value 0.42 V, the "cntL" changes to "1" ("cntL"="1") and the "cntH" changes to "1" ("cntH"="1"), and therefore, the clock gate 45 allows the "cka" to pass. The up/down shift register 44B decreases the number of the turned-on supply transistors by decrementing the value (−1) because "cntL"="1" and "cntH"="1". Then, the VDDMA drops and when the VDDMA falls below the high-level side target value 0.42 V, the "cntH" changes to "0" again ("cntH"="0"), the value of the up/down shift register 44B is kept, and the number of the turned-on supply transistors is also kept. By repeating such an operation, the VDDMA is kept between the low-level side target value 0.40 V and the high-level side target value 0.42 V.

In the second embodiment, it is possible to remove the voltage ripple (fluctuation) caused by the unnecessary increasing/decreasing in the number of the turned-on supply transistors that takes place in the vicinity of the target value of the VDDMA in the first embodiment, and to reduce the power of the control system, such as the up/down shift register 44A, by the function of the clock gate 45.

Next, a semiconductor device of a third embodiment is explained. The semiconductor device of the third embodiment has a configuration similar to the general configuration of the semiconductor device of the first embodiment illustrated in FIG. 5, however, differs from that of the first embodiment in that a clock gate is provided so as to stop the supply of "cka" when the clock "cka" is not supplied to the circuit block 11. Because of this, it is possible to further reduce power consumption of the semiconductor device (LSI).

FIG. 17 is a circuit diagram of the LDO regulator 40 in the semiconductor device of the third embodiment. A portion indicated by reference number 61 is a clock gate that controls the supply of the clock "cka" to the circuit block 11, and the clock gate supplies a clock "ckaa" to the circuit block 11 when gating signal "gating"="1" and stops the supply of "ckaa" when "gating"="0". In the LDO regulator 40 of the third embodiment, the controller 44 controls the number of a plurality of turned-on supply switches in accordance with the gating signal "gating".

FIG. 18A illustrates an example of the configuration of the controller 44 in the third embodiment and FIG. 18B is a diagram illustrating the operation of an up/down shift register 44C.

In the configuration example in FIG. 18A, the controller 44 is implemented by the up/down shift register 44C.

As illustrated in FIG. 18B, the up/down shift register 44C resets all the outputs to "0" at the time of transition from "0" to "1" of the gating signal "gating". Then, all the supply transistors 21A to 21G are turned on only at the instant the state where the supply of the clock "ckaa" to the circuit block 11 is suspended switches to the state where the clock "ckaa" is supplied, thereby the VDDMA is caused to rise once up to the power source voltage VDD level. In other words, in the third embodiment, the LDO regulator 40 has the full-open function to turn all the supply transistors 21A to 21G in an instant at the time of transition from "0" to "1" of the gating signal "gating".

The LDO regulator 40 of the third embodiment operates in the same manner as that of the up/down shift register 44A of the first embodiment when the gating signal "gating" is "0" or "1" and at the time of transition from "1" to "0".

Figure 19:
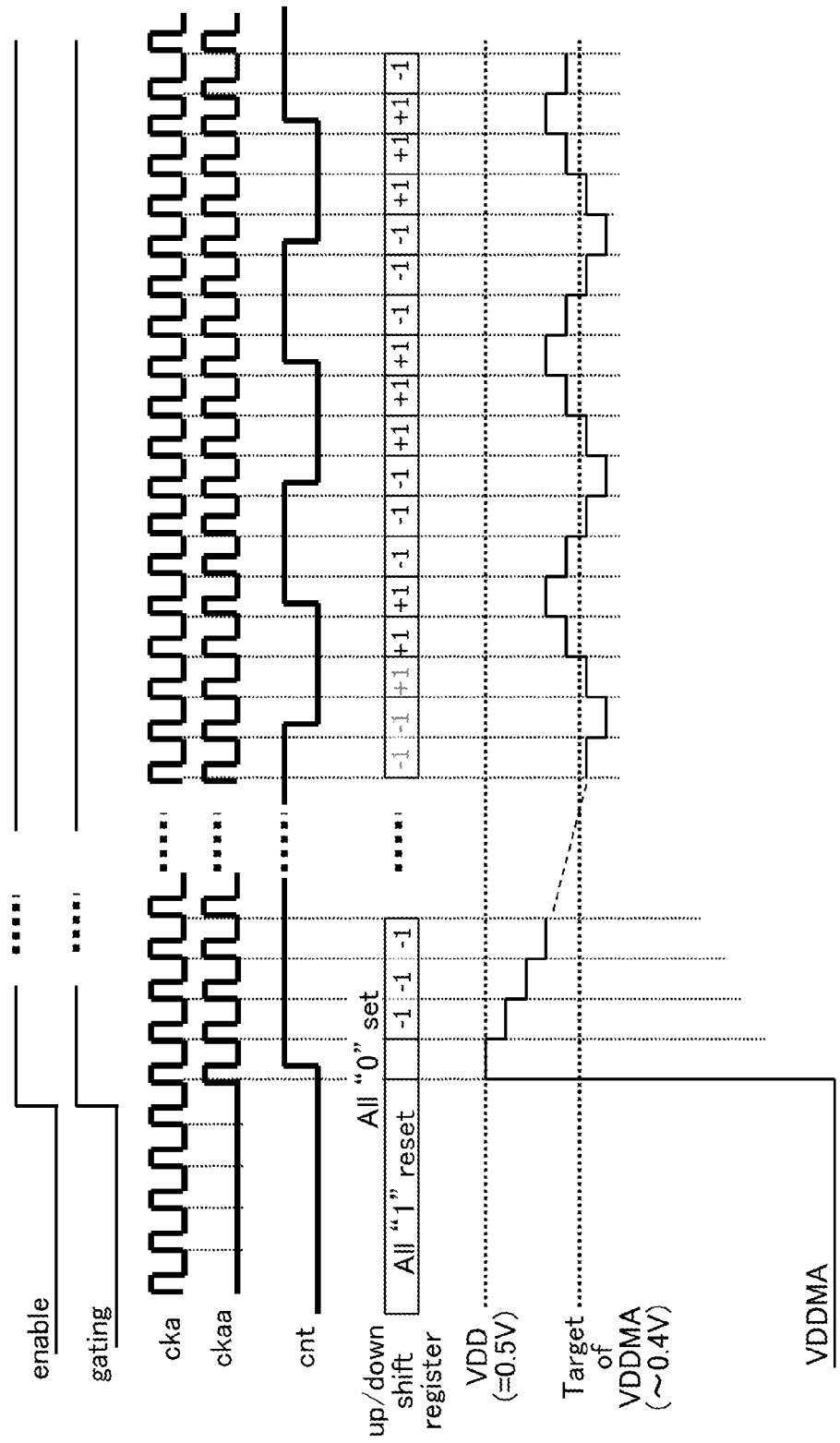
FIG. 19 is a time chart indicating the operation of the LDO regulator of the third embodiment.

FIG. 19 and FIG. 20 are time charts indicating the operation of the LDO regulator of the third embodiment.

When the enable signal "enable" is in the disabled state (0 V), all the outputs of the up/down shift register 44C are reset to "1". Consequently, all the supply transistors 21A to 21G are in the off-state and the VDDMA becomes a state close to the VSS (0 V). FIG. 19 illustrates the case where the gating signal "gating" also changes as the enable signal "enable".

As illustrated in FIG. 19, when the enable signal "enable" and the gating signal "gating" turn to "1", all the outputs of the up/down shift register 44C are reset to "0" and all the supply transistors 21A to 21G turn on. Therefore, the VDDMA rises rapidly from the VSS (0 V) to the power source voltage VDD (0.5 V). In response to this, the ROSC 51 oscillates and because the VDDMA is higher than the target value, the oscillation frequency is high and "cnt"="1", and therefore, at each rise edge of "cka", the value of the up/down shift register 44C is decremented (−1). Because of this, the number of the turned-on supply transistors decreases, the VDDMA drops, and when the target value is exceeded, the "cnt" changes to "0" ("cnt"="0"), thereby the value of the up/down shift register 44C is incremented (+1), thereby the number of the turned-on supply transistors is increased. The above operation is the same as that in the case of the first embodiment. By repeating this operation, the VDDMA is kept in the vicinity of the target value.

FIG. 20 illustrate an example of the operation in the case where the enable signal "enable" is fixed to "1", however, the gating signal "gating" is turned to "0" ("gating"="0") on the way to stop the supply of the clock "ckaa" to the circuit block 11. Even if the gating signal "gating" is turned to "0" ("gating"="0"), the supply of power source to the circuit block 11 is continued and the VDDMA is kept in the vicinity of the target value (0.4 V).

In this state, if the gating signal "gating" is changed to "1" ("gating"="1"), the load of the circuit block 11 increases rapidly and the VDDMA drops rapidly. As illustrated at the lowest part in FIG. 20, in the case of the LDO regulator of the first embodiment, after the VDDMA drops rapidly once, the value of the up/down shift register 44A is incremented and the VDDMA rises level by level. Consequently, it requires time for the VDDMA to reach the target level, and therefore, there may be a case where the circuit block 11 does not operate normally during that period of time.

In contrast to this, in the third embodiment, when the gating signal "gating" changes from "0" to "1", all the values of the up/down shift register 44C turn to "0", and therefore, all the supply transistors turn on and the VDDMA becomes close to the power source voltage VDD. After that, the VDDMA gradually approaches the target value. As described above, the power source voltage VDDMA of the circuit block 11 rises but never falls, and therefore, the circuit block 11 operates normally.

As described above, in the third embodiment, it is possible to suppress such a problem that the VDDMA drops rapidly by the power consumption of the circuit block 11 increasing rapidly at the instant the supply of clock starts in the low-load state where the supply of clock to the circuit block is suspended.

As above, the first to third embodiments are explained, however, for example, it is also possible to combine the configurations of the second embodiment and the third embodiment and by doing so, the advantages of both the second embodiment and the third embodiment are obtained. Further, in the third embodiment, it may also be possible to integrate the enable signal "enable" and the gating signal "gating" into one control signal that functions as both.

In the embodiments explained as above, the need of the analog comparator circuit is obviated in the semiconductor device that mounts the LDO regulator to which the power source voltage is input from outside and which can vary the voltage to be supplied to the internal circuit. Consequently, the operation of the LDO regulator is enabled even under the low-voltage conditions of about 0.5 V, in which the power supply voltage is in the vicinity of the threshold value of the transistor. Further, in the embodiments, the large capacitor element to protect analog potentials to be compared from noise and the large resistor element to configure the variable voltage divider circuit are no longer provided, and therefore, the area occupied by the chip can be reduced.

Figure 4A:
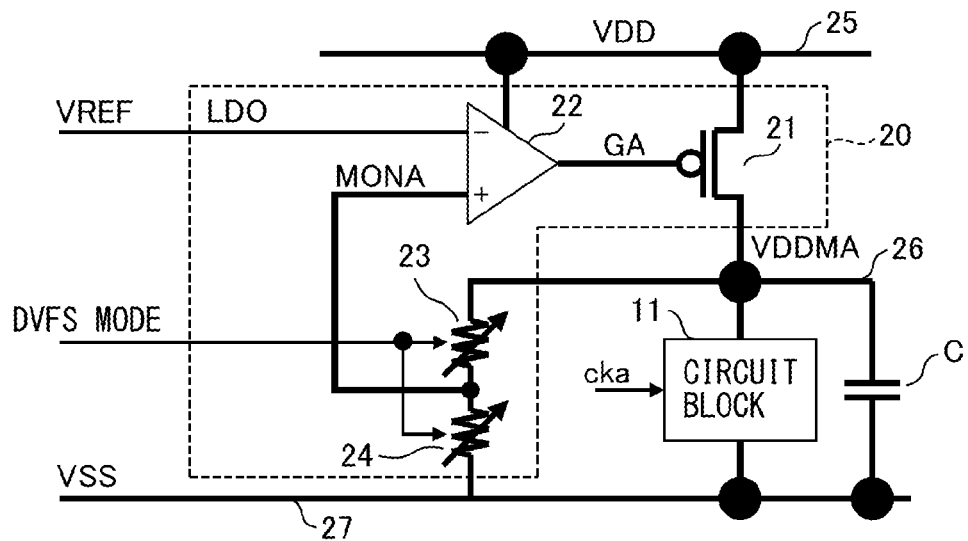
FIG. 4A and FIG. 4B are diagrams illustrating circuit examples of the LDO regulator proposed hitherto, also illustrating together circuit blocks to which the power source voltage is supplied from the LDO regulator.
Figure 4B:
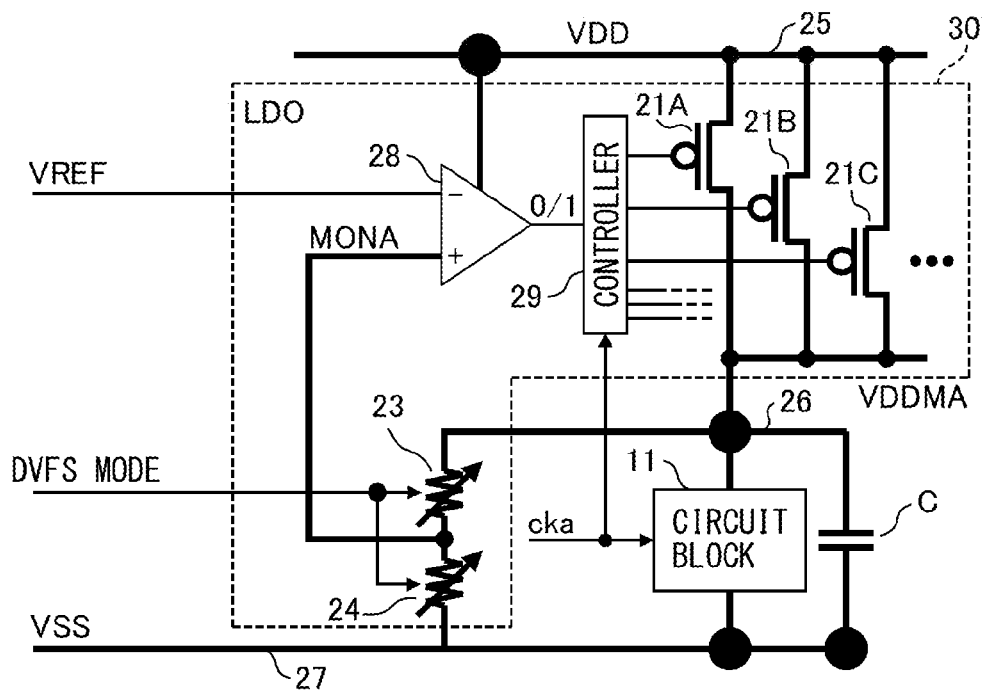

As explained above, when the VDD becomes a further lower voltage equal to or less than 0.5 V, the voltage enters the region where it is difficult for the comparator 28 to determine a slight difference between two potentials to be compared in the digital type LDO regulator in FIG. 4B, and therefore, there arises such a problem that it is not possible to perform an accurate determination.

Further, the capacitor element to protect the reference potential VREF for a potential comparison from noise and the resistor element to configure the voltage divider circuit are provided for both the analog type LDO regulator and the digital type LDO regulator, and this brings about such a problem that the area occupied by the chip increases.

In contrast to this, the semiconductor device of the embodiments accurately determine whether the voltage value of the local power source of each circuit part is higher or lower than the target voltage and accurately controls the plurality of discrete supply switches based on the determination result, and therefore, the DVFS technique is performed stably.

As above, according to the embodiments, the semiconductor that applies the DVFS technique and which accurately operates even if the VDD is as low as 0.5 V or less is implemented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor device comprising:
    a plurality of circuit parts;
    a global power source configured to supply a power source voltage;
    a plurality of power source supply circuits configured to connect local power sources of the plurality of circuit parts and the global power source; and
    a plurality of local power source control circuits provided in correspondence to the plurality of circuit parts and configured to control the plurality of power source supply circuits so that voltage values of the local power sources of the plurality of circuit parts are desired values, wherein
    each of the plurality of power source supply circuits includes a plurality of discrete supply switches,
    each of the plurality of local power source control circuits includes:
        a voltage monitor circuit whose output characteristic value changes discretely in accordance with a change in the voltage value of the local power source;
        a storage circuit configured to store the output target characteristic value of the voltage monitor circuit when the voltage value of the local power source is a desired value;
        a comparator configured to compare the output characteristic value of the voltage monitor circuit and the target characteristic value; and
        a switch control circuit configured to control the number of the plurality of turned-on discrete supply switches based on the comparison result of the comparator.

2. The semiconductor device according to claim 1, wherein the voltage monitor circuit includes:
    a digital monitor circuit whose output signal is a two-valued signal that can be counted and the output signal characteristic of which changes in accordance with a change in the voltage value of the local power source; and
    a counter configured to count the output signal of the digital monitor circuit and to output a count value as the characteristic value.

3. The semiconductor device according to claim 2, wherein the digital monitor circuit is a ring oscillator.

4. The semiconductor device according to claim 3, wherein the storage circuit stores a number of oscillation clocks output from the ring oscillator when the voltage value of the local power source is the desired value.

5. The semiconductor device according to claim 1, wherein the plurality of discrete supply switches is formed by a plurality of discrete MOS transistors.

6. The semiconductor device according to claim 1, wherein the switch control circuit:
    controls so as to increase the number of the plurality of turned-on discrete supply switches when the comparator determines that the voltage value of the local power source is smaller than the desired value; and
    controls so as to decrease the number of the plurality of turned-on discrete supply switches when the comparator determines that the voltage value of the local power source is equal to or larger than the desired value.

7. The semiconductor device according to claim 2, wherein the switch control circuit:
    controls so as to increase the number of the plurality of turned-on discrete supply switches when the comparator determines that the voltage value of the local power source is smaller than the desired value; and
    controls so as to decrease the number of the plurality of turned-on discrete supply switches when the comparator determines that the voltage value of the local power source is equal to or larger than the desired value.

8. The semiconductor device according to claim 3, wherein the switch control circuit:
    controls so as to increase the number of the plurality of turned-on discrete supply switches when the comparator determines that the voltage value of the local power source is smaller than the desired value; and
    controls so as to decrease the number of the plurality of turned-on discrete supply switches when the comparator determines that the voltage value of the local power source is equal to or larger than the desired value.

9. The semiconductor device according to claim 3, wherein the storage circuit stores an upper limit number of oscillation clocks and a lower limit number of oscillation clocks output from the ring oscillator when the voltage value of the local power source is at the upper limit and the lower limit of a predetermined range including the desired value,
    the comparator determines whether the characteristic value of the voltage monitor circuit is smaller than the lower limit number of oscillation clocks, larger than the upper limit number of oscillation clocks, or in a range not less than the lower limit number of oscillation clocks and not more than the upper limit number of oscillation clocks, and
    the switch control circuit:
        increases the number of the plurality of turned-on discrete supply switches when the comparator determines that the characteristic value of the voltage monitor circuit is smaller than the lower limit number of oscillation clocks;
        decreases the number of the plurality of turned-on discrete supply switches when the comparator determines that the characteristic value of the voltage monitor circuit is larger than the upper limit number of oscillation clocks; and
        maintains the number of the plurality of turned-on discrete supply switches when the comparator determines that the characteristic value of the voltage monitor circuit is in a range not less than the lower limit number of oscillation clocks and not more than the upper limit number of oscillation clocks.

10. The semiconductor device according to claim 1, wherein the switch control circuit controls so as to turn on all the plurality of discrete supply switches when a rapid operation change occurs in the corresponding circuit part.

11. The semiconductor device according to claim 3, wherein the switch control circuit controls so as to turn on all the plurality of discrete supply switches when a rapid operation change occurs in the corresponding circuit part.

12. The semiconductor device according to claim 9, wherein the switch control circuit controls so as to turn on all the plurality of discrete supply switches when a rapid operation change occurs in the corresponding circuit part.

13. The semiconductor device according to claim 10, wherein the rapid operation change in the circuit part is an instant at which a clock stop state transits to a supply state.

14. The semiconductor device according to claim 1, wherein the switch control circuit turns off all the plurality of discrete supply switches when stopping the corresponding circuit part.

* * * * *